US011495808B2

(12) United States Patent
Finnerty et al.

(10) Patent No.: US 11,495,808 B2
(45) Date of Patent: Nov. 8, 2022

(54) THERMAL MANAGEMENT OF FUEL CELL UNITS AND SYSTEMS

(71) Applicant: WATT Fuel Cell Corp., Mount Pleasant, PA (US)

(72) Inventors: Caine Finnerty, Mount Pleasant, PA (US); Paul DeWald, Scottdale, PA (US)

(73) Assignee: WATT Fuel Cell Corp., Mount Pleasant, PA (US)

( * ) Notice: Subject to any disclaimer, the term of this patent is extended or adjusted under 35 U.S.C. 154(b) by 0 days.

(21) Appl. No.: 17/244,248

(22) Filed: Apr. 29, 2021

(65) Prior Publication Data
US 2022/0085393 A1 Mar. 17, 2022

Related U.S. Application Data

(60) Division of application No. 15/350,539, filed on Nov. 14, 2016, now Pat. No. 11,018,359, which is a
(Continued)

(51) Int. Cl.
*H01M 8/04701* (2016.01)
*H01M 8/2455* (2016.01)
*H01M 8/0612* (2016.01)
*H01M 8/04007* (2016.01)
*H01M 8/2457* (2016.01)
*H01M 8/249* (2016.01)
(Continued)

(52) U.S. Cl.
CPC ... *H01M 8/04701* (2013.01); *H01M 8/04014* (2013.01); *H01M 8/04029* (2013.01); *H01M 8/04052* (2013.01); *H01M 8/04067* (2013.01); *H01M 8/0625* (2013.01); *H01M 8/222* (2013.01); *H01M 8/249* (2013.01); *H01M 8/2455* (2013.01); *H01M 8/2457* (2016.02); *H01M 2250/405* (2013.01); *Y02B 90/10* (2013.01)

(58) Field of Classification Search
CPC ........... H01M 8/04701; H01M 8/2457; H01M 8/04014; H01M 8/04029; H01M 8/04052; H01M 8/04067; H01M 8/0625
See application file for complete search history.

(56) References Cited

U.S. PATENT DOCUMENTS

| 5,763,114 A | 6/1998 | Khandkar et al. |
| 5,980,726 A | 11/1999 | Moulthrop, Jr. et al. |

(Continued)

FOREIGN PATENT DOCUMENTS

| EP | 2608306 A1 | 6/2013 |
| EP | 2816647 A1 | 12/2014 |

(Continued)

OTHER PUBLICATIONS

International Search Report (10 pages) and Written Opinion of the International Searching Authority (34 pages) for International Application No. PCT/US2015/051209.

*Primary Examiner* — Jayne L Mershon
(74) *Attorney, Agent, or Firm* — Goodwin Procter LLP

(57) ABSTRACT

Various designs and configurations of and methods of operating fuel cell units, fuel cell systems and combined heat and power systems are provided that permit efficient thermal management of such units and systems to improve their operation.

20 Claims, 13 Drawing Sheets

Related U.S. Application Data continuation of application No. PCT/US2015/051209, filed on Sep. 21, 2015.

(60) Provisional application No. 62/052,706, filed on Sep. 19, 2014.

(51) Int. Cl.
   *H01M 8/04014* (2016.01)
   *H01M 8/04029* (2016.01)
   *H01M 8/22* (2006.01)

(56) References Cited

U.S. PATENT DOCUMENTS

| | | | |
|---|---|---|---|
| 6,368,737 B1* | 4/2002 | Margiott | H01M 8/04074 |
| | | | 429/437 |
| 8,821,832 B2* | 9/2014 | Brantley | C01B 3/386 |
| | | | 423/652 |
| 2004/0086765 A1 | 5/2004 | Florence et al. | |
| 2005/0269548 A1 | 12/2005 | Jeffcoate et al. | |
| 2006/0147771 A1 | 7/2006 | Russell et al. | |
| 2010/0227233 A1 | 9/2010 | Yamamoto et al. | |
| 2011/0053023 A1 | 3/2011 | Johansen et al. | |
| 2011/0250513 A1* | 10/2011 | Akikusa | H01M 8/2475 |
| | | | 429/408 |
| 2011/0294028 A1 | 12/2011 | Hannesen et al. | |

FOREIGN PATENT DOCUMENTS

| | | |
|---|---|---|
| EP | 2892100 A1 | 7/2015 |
| JP | 2003-115307 A | 4/2003 |
| JP | 2005-158501 A | 6/2005 |
| JP | 2005-530326 A | 10/2005 |
| JP | 2009-76274 A | 4/2009 |
| JP | 2009-99437 A | 5/2009 |
| JP | 2011-8916 A | 1/2011 |
| JP | 2012-142217 A | 7/2012 |
| JP | 2013-105612 A | 5/2013 |
| JP | 2013-168264 A | 8/2013 |
| JP | 2013-216524 A | 10/2013 |
| WO | WO-2008/099575 A1 | 8/2008 |
| WO | WO-2010/004093 A1 | 1/2010 |
| WO | WO-2010/122779 A1 | 10/2010 |
| WO | WO-2013/122124 A1 | 8/2013 |
| WO | WO-2014/034141 A1 | 3/2014 |
| WO | WO-2014/126595 A1 | 8/2014 |

* cited by examiner

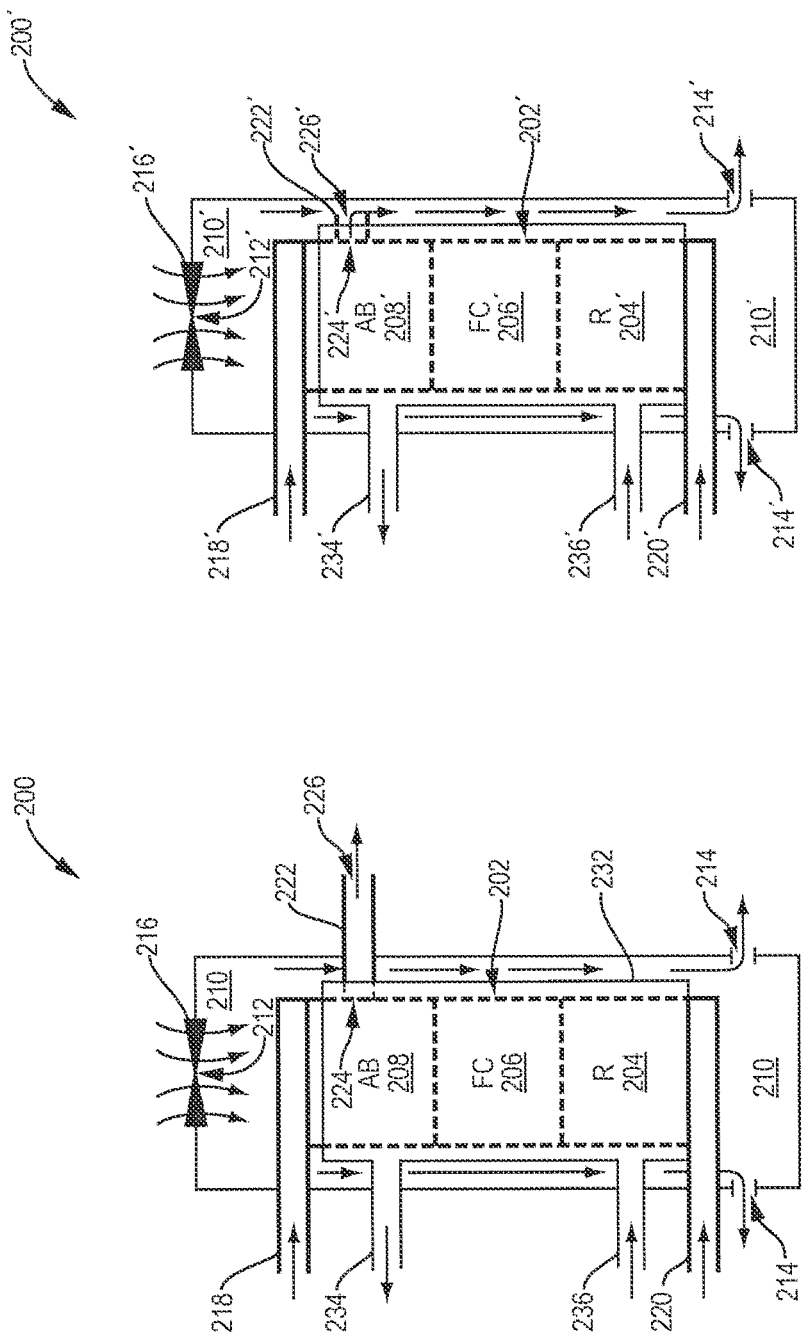

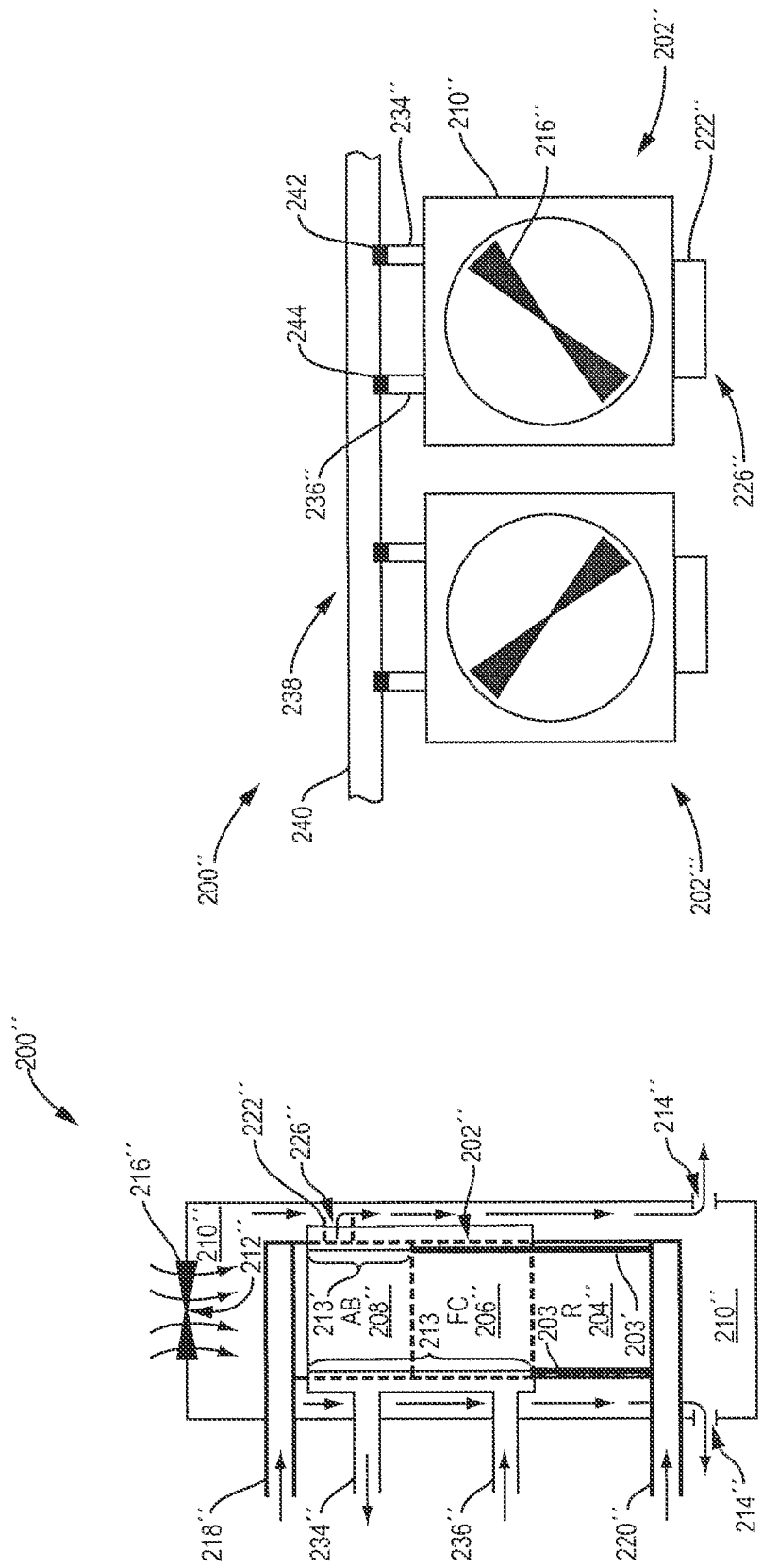

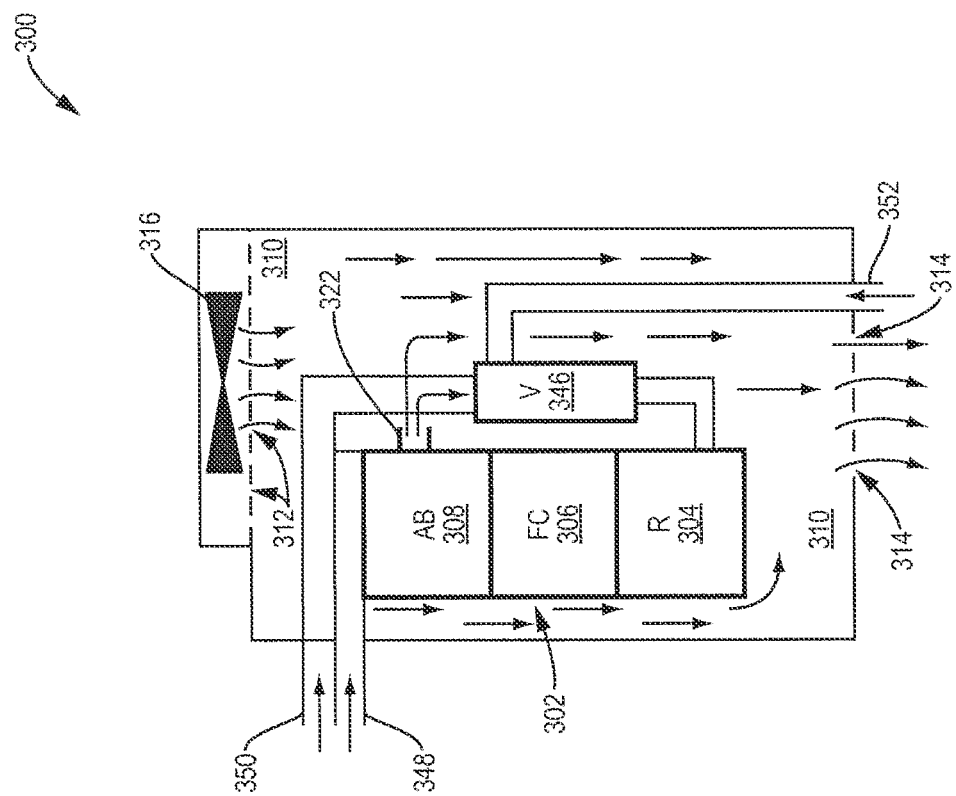

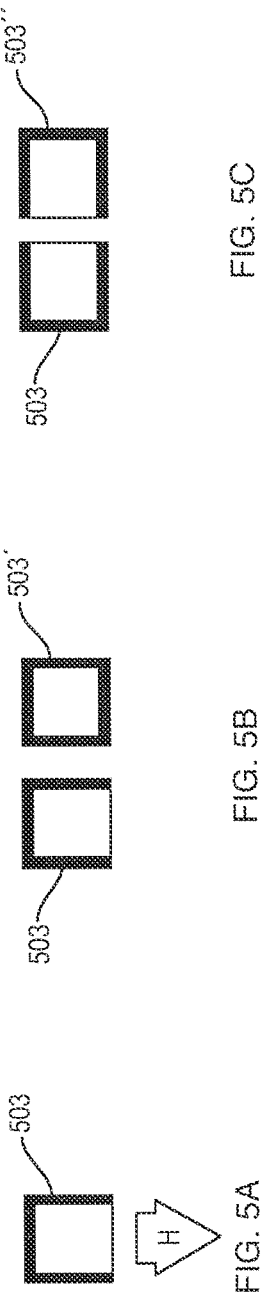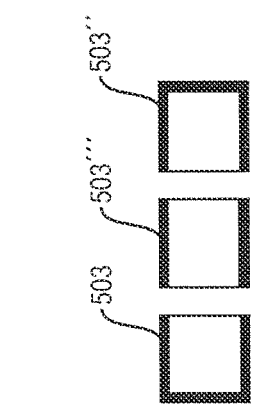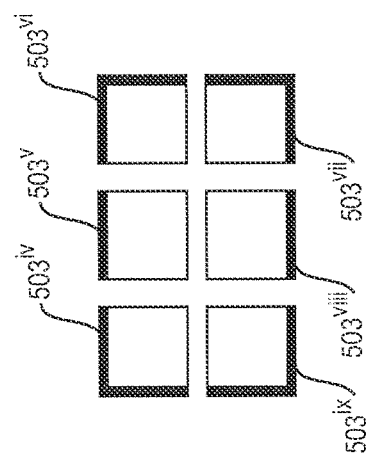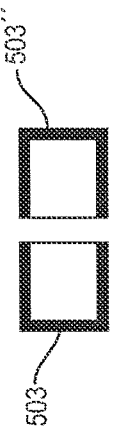
FIG. 5A    FIG. 5B    FIG. 5C    FIG. 5D    FIG. 5E

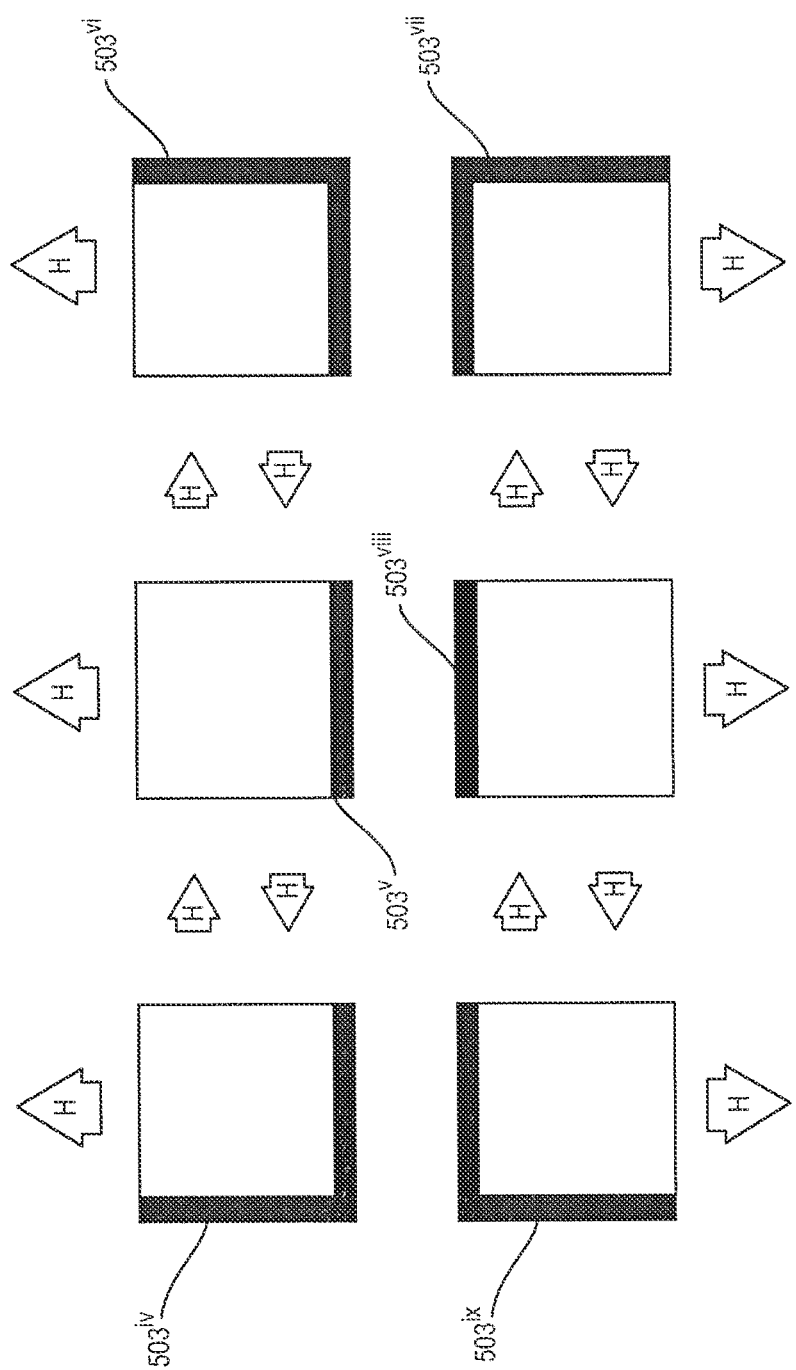

THERMAL MANAGEMENT OF FUEL CELL UNITS AND SYSTEMS

CROSS-REFERENCE TO RELATED APPLICATIONS

This application is a divisional patent application under 35 U.S.C. §§ 120 and 121 of U.S. patent application Ser. No. 15/350,539, filed on Nov. 14, 2016, which is a continuation of International Application No. PCT/US2015/051209, filed on Sep. 21, 2015, which claims priority to and the benefit of U.S. Patent Application No. 62/052,706, filed on Sep. 19, 2014, each of which is incorporated by reference herein in its entirety.

FIELD

The present teachings relate generally to fuel cell units and systems. More particularly, the present teachings related to the thermal management of a fuel cell unit and a fuel cell system.

BACKGROUND

Thermal management of a fuel cell system or a combined heat and power ("CHP") system (which can include one or more fuel cell units) is an important consideration in their design for efficient operation and generation of electricity and/or heat. To manage thermally fuel cell systems, air flow typically is used to move heated air and other fluids through a fuel cell unit and the system including through the vents of the fuel cells stacks. However, the use of air flow to manage thermally a fuel cell system can create undesirable pressure drops and associated fluid flow distribution anomalies throughout the system, impacting its operation.

In the case of a fuel cell system where a plurality of fuel cell stacks are present and aligned in an array, cool air frequently is delivered linearly across the array from one end to the other to assist in controlling the temperature of the fuel cell stacks. However, in such an arrangement, although the first fuel cell units in the array can be sufficiently cooled or temperature-regulated, often the fuel cell units that are last to experience the "cool" air are insufficiently temperature-regulated as the delivered air is heated as it moves through the system and become ineffective in regulating the temperature of the latter fuel cell units, where current collection and other temperature-sensitive structure or electronics may be located. Moreover, such a configuration in operation can cause variable temperatures within the system, for example, producing "hot spots" and/or "cold spots," as air flow is increased to attempt to compensate for the lack of thermal control.

In addition, air exhaust streams from fuel cells and/or heaters often transfer the heat of the exhausted gas to circulating water via a heat exchanger to effect gas-to-liquid heat transfer. In such a case, the air exhaust stream typically needs to be diluted to reduce its temperature to avoid boiling the water in the exhaust stream.

Thus, for more efficient and consistent operation of a fuel cell or CHP system, the art desires new designs and configurations of fuel cell units and fuel cell and CHP systems and methods of operating such units and systems that can manage better and more efficiently the thermal environment around a fuel cell unit and/or within a fuel cell or CHP system.

SUMMARY

The present teachings provide fuel cell units, fuel cell systems, and fuel cell units as or integrated into CHP systems as well as methods of thermally managing such units and systems that can address various deficiencies and shortcomings of the state-of-the-art, including those outlined above. More specifically, the design and configuration of fuel cell units, fuel cell systems, and CHP systems including fuel cell unit(s) and practice of the methods according to the present teachings can permit more efficient thermal management of fuel cell units including those in a fuel cell system or a CHP system.

For example, one feature of the present teachings is that individual fuel cell units of a fuel cell system can be within a thermally-shielded zone. Each thermally-shielded zone can include a temperature-regulating fluid inlet and one or more exhaust fluid outlets, thereby permitting independent monitoring and management of the thermal environment for each fuel cell unit for increased control of a fuel cell system. A source of positive gaseous pressure such as a fan or blower can be in operable fluid communication with a temperature-regulating fluid inlet to facilitate movement and heat transfer within a thermally-shielded zone. In such arrangements, a fuel cell unit can be cooled more quickly and efficiently. Moreover, the fuel cell or CHP system can have a smaller footprint or package because the fuel cell units and/or the heater units are not uncontrollably radiating heat outward.

Another feature is that a fuel cell system of the present teachings can be designed to take advantage of the heat from the exhaust from a fuel cell unit. When heated exhaust fluids are released within a thermally-shielded zone, the heat can be used for heating the components of the fuel cell unit within the thermally-shielded zone. For example, a fuel cell unit can have a vaporizer located within a thermally-shielded zone and the heat of the exhaust fluids within the thermally-shielded zone can assist in preheating liquid reformable fuels and fluid streams prior to introduction to the vaporizer as well as to assist in maintaining the operating temperature of the vaporizer. Where the heated exhaust fluids are released outside of a thermally-shielded zone, the exhaust streams from two or more fuel cell units can be combined, for example, pointed at each other, and used for heating other components of the fuel cell or CHP system such as those components present between the thermally-shielded zones of the fuel cell units. In other words, the heated exhaust fluids can be combined and create a heated zone between the two or more fuel cell units. Moreover, heated exhaust fluids can be contacted with a liquid heat-exchange plate or a liquid heat-exchange jacket associated with a fuel cell unit or system to capture and control the thermal environment.

Yet another feature is that a fuel cell unit of the present teachings can be designed to transfer preferentially heat through and/or from at least one face, or segments of a face, or one surface of the fuel cell unit, where a reduced level of thermal insulation can be in contact with, adjacent to, and/or in thermal communication with the at least one face or segment thereof or one surface of the fuel cell unit. A retaining structure can secure the thermal insulation including reduced levels of thermal insulation about the fuel cell unit as needed. The retaining structure typically is a thermally conductive material and can be in the form of a sheet such as a metal sheet or "sheet metal." The retaining structure can be or include a carbon fiber. A fuel cell unit including thermal insulation and/or a retaining structure can be located in a thermally-regulated zone or a thermally-shielded zone. In similar fashion, more than one face or segment thereof or one surface of a fuel cell unit or a thermally-regulated zone can be associated with a reduced level of thermal insulation.

Likewise, an array of fuel cells and/or thermally-regulated zones can have one or more of their faces or segments thereof or surfaces associated with a reduced level of thermal insulation to transfer heat preferentially among the array of fuel cell units. For example, heat from two or more fuel cell units and/or thermally-regulated zones can be preferentially transferred towards each other or among the fuel cell units and/or thermally-regulated zones to create a heated zone between or among the units and/or zones. The thermal insulation can include solid thermal insulation and/or fluid thermal insulation. A thermally-regulated zone can include a temperature-regulating fluid inlet and one or more exhaust outlets. A source of positive gas pressure can be in operable fluid communication with the temperature-regulating fluid inlet(s) and one or more of a reformer, a fuel cell stack, and an afterburner.

Still another feature of the present teachings is that one or more components of a fuel cell unit such as a fuel cell stack and/or an afterburner can be in thermal communication with a liquid heat-exchange plate or a liquid heat-exchange jacket to facilitate heat transfer from these components of a fuel cell unit and assist in its thermal management and that of the fuel cell system. In particular embodiments, a liquid heat-exchange jacket or a liquid heat-exchange plate can be a retaining structure for the fuel cell unit and its associated thermal insulation. For example, the thermal insulation such as a reduced level of thermal insulation can be in contact with a liquid heat-exchange jacket or a liquid heat-exchange plate.

An additional feature and benefit of the present teachings is that the heated heat-exchange liquid exiting the liquid heat-exchange plate or the liquid heat-exchange jacket can be routed or delivered for a variety of purposes and can conserve the energy of the system for efficient use. As one example, using a liquid heat-exchange plate or a liquid heat-exchange jacket to cool a fuel cell unit can permit a reduced amount of or less cathode air to be flowed or delivered through the system as the exhaust streams can be cooler and require less dilution.

In addition, a combination of features of the present teachings can include a liquid heat-exchange plate or a liquid heat-exchange jacket associated with, for example, in thermal communication with, one or more faces or surfaces of a fuel cell unit associated with a reduced level of thermal insulation, thereby to transfer preferentially heat from the fuel cell unit (from or through the one or more faces or surfaces associated with a reduced level of thermal insulation) to the heat-exchange liquid. Such an arrangement as well as others described herein can permit heat sensitive components and structure such as electronics and balance of plant components to be located in lower temperature (cooler) zones of the fuel cell or CHP system.

Other features of the present teachings include a common (reformable) fuel source conduit permitting multiple fuel cell units, for example, their reformers and/or vaporizers, to be connected or coupled thereto, and/or a common liquid heat-exchange conduit, permitting multiple heat-exchange plates or jackets of individual fuel cell units to be connected or coupled thereto. In such a design, fuel cell units can be interchanged readily in a multi-fuel cell unit system or a CHP system, including interchangeable heater unit(s). Moreover, the valve assemblies, sensor assemblies, and/or control system including a controller can be in communication among each other to control logically the flow path of fluids individually for each fuel cell unit and/or heater unit of a fuel cell system and/or CHP system as desired for a particular application, which can include start-up and shut-down modes as well as the coupling and decoupling of a fuel cell unit or a heater unit to a common fuel source conduit and/or a common liquid heat-exchange conduit.

Accordingly, one aspect of the present teachings is a fuel cell system including configurations and/or features that permit more efficient thermal management of the system. In various embodiments, a fuel cell system includes one or more fuel cell units, where the fuel cell unit includes a reformer; a fuel cell stack in operable fluid communication with the reformer; and an afterburner in operable fluid communication with the fuel cell stack. The fuel cell unit can be within a thermally-shielded zone or a thermally-regulated zone. A thermally-shielded zone and a thermally-regulated zone can include a temperature-regulating fluid inlet and one or more exhaust fluid outlets. A source of positive gaseous pressure such as a fan or blower can be in operable fluid communication with the temperature-regulating fluid inlet(s) and one or more of the reformer, the fuel cell stack and the afterburner.

In various embodiments, a fuel cell system includes one or more fuel cell units including a reformer; a fuel cell stack in operable fluid communication with the reformer; an afterburner in operable fluid communication with the fuel cell stack; and a vaporizer in thermal communication with the afterburner and in operable fluid communication with the reformer. The fuel cell unit can be within a thermally-shielded zone or a thermally-regulated zone, where the thermally-shielded zone and the thermally-regulated zone include a temperature-regulating fluid inlet and one or more exhaust fluid outlets. A source of positive gaseous pressure can be in operable fluid communication with the temperature-regulating fluid inlet(s) and one or more of the reformer, the fuel cell stack and the afterburner.

In some embodiments, a fuel cell system of the present teachings can include at least a first fuel cell unit and a second fuel cell unit. Each fuel cell unit can include a reformer; a fuel cell stack in operable fluid communication with the reformer; and an afterburner in operable fluid communication with the fuel cell stack. Thermal insulation such as solid thermal insulation and/or fluid thermal insulation can be distributed about a fuel cell unit. A reduced level of thermal insulation can be in contact with, adjacent to, and/or in thermal communication with at least one face, or segment thereof, or one surface of the first fuel cell unit and/or the second fuel cell unit, for example, on or adjacent to at least one of the reformer, the fuel cell stack, and the afterburner of the first fuel cell unit and/or the reformer, the fuel cell stack, and the afterburner of the second fuel cell unit, thereby to increase heat transfer through and/or from the at least one face, segment thereof, or one surface associated with the reduced level of thermal insulation. A fuel cell unit associated with or having a reduce level of thermal insulation can be within a thermally-regulated zone or a thermally-shielded zone, where the thermally-regulated zone or the thermally-shielded zone can include one or more temperature-regulating fluid inlets and one or more exhaust outlets.

In certain embodiments, each of at least a first fuel cell unit and a second fuel cell unit independently includes a reformer; a fuel cell stack in operable fluid communication with the reformer; an afterburner in operable fluid communication with the fuel cell stack; and an exhaust conduit in thermal and operable fluid communication with the afterburner, where the exhaust conduit includes an upstream end and a downstream end. The downstream end of the exhaust conduit of first fuel cell unit can be directed towards the downstream end of the exhaust conduit of the second fuel cell unit whereby the exhaust streams from each fuel cell unit can combine, for example, in a channel between the two fuel cell units thereby creating a "heated zone."

In particular embodiments, a fuel cell system of the present teachings can include a liquid heat-exchange plate or a liquid heat-exchange jacket in thermal communication with one or more of a reformer, a fuel cell stack, and an afterburner of a fuel cell unit or independently a first fuel cell unit and a second fuel cell unit. A liquid heat-exchange jacket can be in thermal communication with, for example, in contact with, one or more faces, or segments thereof, or surfaces of one or more of a reformer, a fuel cell stack, and an afterburner, and/or can encompass and contact, be adjacent to and/or be in thermal communication with an exposed perimeter such as a circumference or a partial perimeter of one or more of the reformer, the fuel cell stack, and the afterburner.

In some embodiments, a liquid heat-exchange plate or a liquid heat-exchange jacket can be in thermal communication with at least one face, or segment thereof, or one surface of a fuel cell unit, such as of a reformer, a fuel cell stack and/or an afterburner, associated with a reduced level of thermal insulation thereby to increase preferentially heat transfer to the circulating heat-exchange liquid through and/or from the at least one face or one surface associated with the reduced level of thermal insulation. The liquid heat-exchange plate or the liquid heat-exchange jacket can be adjacent to one or more of the reformer, the fuel cell stack and/or the afterburner such as being in contact with the thermal insulation, for example, a reduced level of thermal insulation, in contact with, adjacent to and/or in thermal communication with the reformer, the fuel cell stack and/or the afterburner, or being in contact with or adjacent to a retaining structure of the fuel cell unit. In such an arrangement, thermal insulation and/or a retaining structure can be between the reformer, the fuel cell stack and/or the afterburner and the liquid heat-exchange plate or the liquid heat-exchange jacket. A liquid heat-exchange plate or a liquid heat-exchange jacket can include an interface configured to connect the liquid heat-exchange plate or the liquid heat-exchange jacket to a common liquid heat-exchange conduit of the fuel cell system.

In various embodiments, the present teachings provide a CHP system including a fuel cell system of the present teachings; and a heater unit positioned adjacent to a fuel cell unit, or at least one of a first fuel cell unit and a second fuel cell unit.

In some embodiments, the fuel cell system or CHP system can include a common (reformable) fuel source conduit. A common fuel source conduit can be in operable fluid communication with one or more of a reformer and a vaporizer of a fuel cell unit.

In another aspect, the present teachings provide methods of managing thermally a fuel cell system including a fuel cell unit. In various embodiments, a method of thermally managing a fuel cell system can include delivering temperature-regulating fluids through a temperature-regulating fluid inlet of a thermally-shielded zone or a thermally-regulated zone; and exhausting heated exhaust fluids through one or more exhaust fluid outlets of the thermally-shielded zone or the thermally-regulated zone. The fuel cell unit can be within a thermally-shielded zone or a thermally-regulated zone. The heated exhaust fluids can include heated temperature-regulating fluids. The heated exhaust fluids can include heated afterburner combustion products.

In various embodiments, methods of thermally managing a fuel cell system can include exhausting heated fluid, for example, from an exhaust conduit, from a first fuel cell unit towards a second fuel cell unit; and exhausting heated fluid from the second fuel cell unit towards the first fuel cell unit. Each of the first fuel cell unit and the second fuel cell unit independently can be within a thermally-shielded zone or a thermally-regulated zone. For example, the first fuel cell unit can be within its own thermally-shielded zone and the second fuel cell unit can be within its own thermally-shielded zone such that the first fuel cell unit and the second fuel cell unit are thermally-shielded from each other.

In some embodiments, methods of thermally managing a fuel cell system can include transferring heat preferentially from a face or a surface of a first fuel cell unit, where a reduced level of thermal insulation can be on, adjacent to, and/or in thermal communication with the face, the segment thereof, or the surface of the first fuel cell unit thereby to increase heat transfer through and/or from the face, the segment thereof, or the surface of the first fuel cell unit associated with the reduced level of thermal insulation. The methods also can include transferring heat preferentially from a face or a surface of a second fuel cell unit in a similar fashion. In methods using preferential heat transfer as described herein, one or more of the fuel cell units and/or heater units can be within a thermally-shielded zone or a thermally-regulated zone, where the thermally-shielded zone or the thermally-regulated zone includes one or more temperature-regulating fluid inlets and exhaust fluid outlets.

In certain embodiments, methods of the present teachings can include circulating a heat-exchange liquid in thermal communication with one or more of a reformer, a fuel cell stack and an afterburner of a fuel cell unit, or independently a first fuel cell unit and/or a second fuel cell unit, to promote heat transfer from one or more of the reformers, the fuel cell stacks, and the afterburners to the circulating heat-exchange liquid. The methods can include transferring heat preferentially to the circulating heat-exchange liquid, for example, from one or more faces or surfaces of a fuel cell unit associated with a reduced level of thermal insulation in contact with, adjacent to, and/or in thermal communication with the one or more faces or surfaces of the fuel cell unit. Circulating a heat-exchange liquid can include circulating a heat-exchange liquid including water and/or a glycol. The methods can include connecting the fuel cell unit, or independently the first fuel cell unit and the second fuel cell unit, to a common liquid heat-exchange conduit of the fuel cell system. The methods can include delivering heated heat-exchange liquid to one or more of a liquid-to-liquid heat exchanger, a liquid-to-gas heat exchanger, and an air conditioning unit or system.

In particular embodiments, methods of the present teachings can include connecting a fuel cell unit and/or a heater unit, or independently the first fuel cell unit and the second fuel cell unit, to a common fuel source conduit of a fuel cell system.

The foregoing as well as other features and advantages of the present teachings will be more fully understood from the following figures, description, examples, and claims.

BRIEF DESCRIPTION OF THE DRAWINGS

It should be understood that the drawings described below are for illustration purposes only. Like numerals generally refer to like parts. The drawings are not necessarily to scale, with emphasis generally being placed upon illustrating the principles of the present teachings. The drawings are not intended to limit the scope of the present teachings in any way.

FIG. 2A is a schematic diagram of a side cross-sectional view of an embodiment of a fuel cell system of the present teachings depicting a fuel cell unit similar to the one shown in FIG. 1A but the afterburner, fuel cell stack and reformer are in contact with a liquid heat-exchange plate or a liquid heat-exchange jacket.

FIG. 2B is a schematic diagram of a side cross-sectional view of an embodiment of a fuel cell system of the present teachings depicting a fuel cell unit similar to the one shown in FIG. 1B but the afterburner, fuel cell stack and reformer are in contact with a liquid heat-exchange plate or a liquid heat-exchange jacket.

FIG. 2C is a schematic diagram of a side cross-sectional view of an embodiment of a fuel cell system of the present teachings depicting a fuel cell unit similar to the one shown in FIG. 2B except that only the afterburner and fuel cell stack are in contact with a liquid heat-exchange plate or a liquid heat-exchange jacket where at least two of the faces of the afterburner and one face of the fuel cell stack include a reduced level of thermal insulation for preferential heat transfer to the liquid heat-exchange liquid.

FIG. 2D is a schematic diagram of a top view of an embodiment of a fuel cell system of the present teachings depicting two fuel cell units similar to those of FIG. 2A, but where each liquid heat-exchange plate or liquid heat-exchange jacket is coupled to a common liquid heat-exchange conduit.

FIG. 3 is a schematic diagram of a side cross-sectional view of an embodiment of a fuel cell system of the present teachings where a fuel cell unit including a vaporizer is within a thermally-shielded zone and the downstream end of the exhaust conduit from the afterburner terminates within the thermally-shielded zone.

FIGS. 5A-F are schematic diagrams of top views of various configurations of fuel cell systems of the present teachings. Each fuel cell unit and its thermal insulation is represented by a square or a rectangle, where thermal insulation is associated with each face or surface around the perimeter of the fuel cell unit within the square or rectangle. A face or surface of a fuel cell unit associated with a reduced level of thermal insulation is represented with a thinner line compared to other faces or surfaces represented by thicker lines. FIG. 5A depicts a top view of a square horizontal cross-section of a fuel cell unit and its thermal insulation. FIG. 5B depicts a first fuel cell unit and to its right hand side, a second fuel cell unit, along with their respective thermal insulation, where the second fuel cell unit can be within a thermally-shielded zone or a thermally-regulated zone so that no preferential heat transfer occurs from the second fuel cell unit. FIG. 5C depicts a first fuel cell unit and a second fuel cell unit, along with their respective thermal insulation, where preferential heat transfer can occur from one fuel cell unit towards the other fuel cell unit, and vice versa. FIG. 5D depicts a first fuel cell unit, a second fuel cell unit, and a third fuel cell unit, along with their respective thermal insulation, where two faces or surfaces of the middle fuel cell unit can preferentially transfer heat to or receive heat from the other two fuel cell units. FIG. 5E depicts a 2×3 array of fuel cell units and their respective thermal insulation, where the fuel cell units not only preferentially can transfer heat between or among each 1×3 array, but also preferentially can transfer heat into and across the channel formed by each 1×3 array. FIG. 5F depicts another 2×3 array of fuel cell units and their respective thermal insulation, where the heat generated by the fuel cell units can be preferentially transferred outward and away from the internal channel formed between each 1×3 array of fuel cell units.

DETAILED DESCRIPTION

Figure 1B:
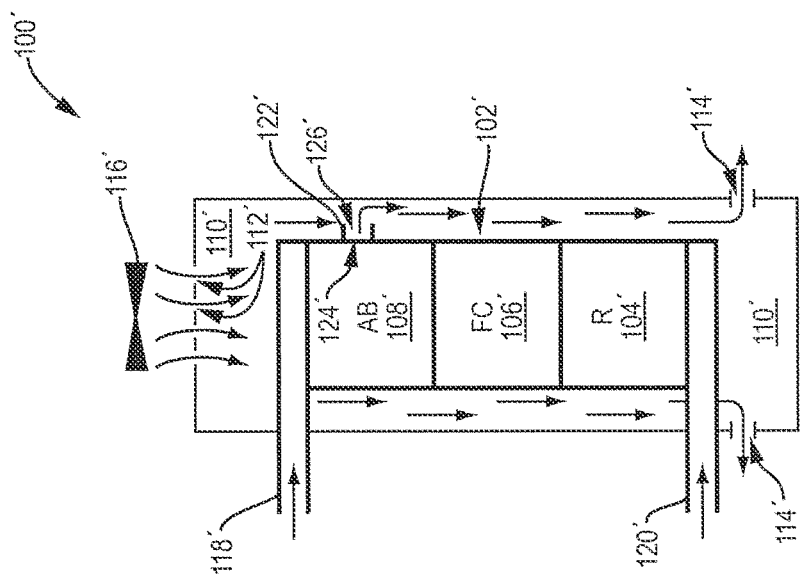
FIG. 1B is a schematic diagram of a side cross-sectional view of an embodiment of a fuel cell system of the present teachings depicting a fuel cell unit similar to the one shown in FIG. 1A but the downstream end of the exhaust conduit from the afterburner terminates within the thermally-shielded zone.

It now has been discovered that the thermal management of a fuel cell unit, a fuel cell system, and a combined heat and power ("CHP") system can be improved by the practice of the present teachings. More specifically, the present teachings provide a fuel cell unit with various configurations and features that advantageously capture and use heat generated by one or more components of the unit or system and/or permit the regulation of the environment, for example, the thermal environment, around a fuel cell unit and/or within a fuel cell or CHP system.

The configurations and designs of fuel cell units and systems of the present teachings can increase regulation and control of the thermal environment surrounding a fuel cell unit. For example, each individual fuel cell unit in a fuel cell or CHP system can be within a thermally-shielded zone such that the thermal environment of each fuel cell can be controlled for efficient operation of each fuel cell unit of the system. Such control can be achieved by the use of a source of positive gaseous pressure such as a fan or blower in operable fluid communication with the interior of the thermally-shielded zone through a temperature-regulating fluid inlet. The source of positive gaseous pressure can be in fluid communication with the interior of the thermally-shielded zone by being present in the thermally-shielded zone (or a thermally-regulated zone), for example, a fan or blower present and in direct fluid communication with components of a fuel cell unit within the zone such that a temperature-regulating fluid inlet is unnecessary.

The thermally-shielded zone can include one or more exhaust fluid outlets to exhaust heated fluids, for example, including gas passed through the temperature-regulating fluid inlet. In operation, the temperature within a thermally-shielded zone around a fuel cell unit can be monitored and the flow of gas such as air from the source of positive gaseous pressure can be adjusted to achieve the proper balance of heat circulation and/or exchange to regulate the temperature around the fuel cell accordingly. The same process can occur independently for each fuel cell unit of the system thereby providing more efficient thermal management of the fuel cell system and addressing certain disadvantages of the state-of-the-art.

The present teachings can exploit the heat generated during the operation of a fuel cell unit and use that heat to heat (or preheat) one or more fluid streams of a fuel cell unit or a fuel cell or CHP system. For example, the generated heat can be used to heat one or more of a cathode air stream, an anode reactants or fuel stream, and a liquid reformable fuel, for example, prior to delivery to a vaporizer. The generated heat can be used to maintain vaporized liquid reformable fuel in a gaseous state while being delivered from the vaporizer to a reformer. A vaporizer can be present within a thermally-shield zone. Accordingly, the heat generated by a fuel cell unit in thermal communication with the vaporizer can assist in heating the vaporizer and the fluids moving to and from it.

The generated heat can be transferred to a heat-exchange liquid such as water and/or a glycol, for example, in a liquid heat-exchange plate or a liquid heat-exchange jacket that is in thermal communication with the heat-generating components of a fuel cell unit such as the reformer, the fuel cell stack and/or the afterburner. Where the thermal load of the fuel cell unit is increased, a liquid heat-exchange plate or a liquid heat-exchange jacket can be present on more faces or surfaces of the fuel cell unit, i.e., have increased and more available surface area for heat exchange. The heated heat-exchange liquid can be routed or delivered to a fluid or hydraulic circuit panel that can direct the heated heat-exchange liquid via one or more flow paths, for example, using a pump, to various devices for various purposes including the following examples as well as others described herein.

First, the heated heat-exchange liquid can be delivered to a liquid-to-liquid heat exchanger or a liquid-to-gas heat exchanger that can act as a heat rejection sink or loop to reduce the temperature of the heat-exchange liquid and/or assist in maintaining the range of temperatures appropriate for the heat-exchange liquid. That is, the circulating heat-exchange liquid can be maintained within a fixed temperature range, for example, by using a thermostat controller associated with this fluid path or circuit along with the appropriate heat exchanger (which may require the addition of heat until the fuel cell unit or system is operating in a steady-state mode). In certain embodiments, particularly those applications having a high thermal output, additional thermal insulation can be provided between the fuel cell unit or certain of its components and a liquid heat-exchange plate or a liquid heat-exchange jacket to assist in controlling the temperature of the heat-exchange liquid to prevent it from reaching its boiling point.

Second, the heated heat-exchange liquid can be delivered to a liquid-to-liquid heat exchanger such as a water tank to facilitate efficient liquid-to-liquid heat transfer, for example, to provide baseboard heat or to heat other components or materials with the hot water.

Third, the heated heat-exchange liquid can be delivered to a liquid-to-gas (e.g., liquid-to-air) heat exchanger such as where heated heat-exchange liquid can be present in thermally-conductive fins or across a large thermally-conductive surface area component and a gas such as air can be blown across the fins or large surface area to heat the gas or air which can be useful, for example, as cabin air.

In a final example, the heated heat-exchange liquid can be delivered to an air conditioning system such as an ammonia-based air conditioning unit or system where the already-generated heat waste can be used as a heat source. The heated heat-exchange fluid such as heated water and/or glycol also can be used as a source of heat in a CHP system.

In certain designs and configurations, for example, where an exhaust conduit from an afterburner terminates within a thermally-shielded zone or a thermally-regulated zone, the heat from the heated afterburner combustion products also can be used to assist in heating the vaporizer, its associated fluids, and other components and fluid streams within the thermally-shielded or thermally-regulated zone. In these configurations, heated temperature-regulating fluids and heated afterburner combustion products can be exhausted through the one or more exhaust fluid outlets of a thermally-shielded zone or can be preferentially transferred through one or more faces or surfaces of a fuel cell unit and/or a thermally-regulated zone.

A fuel cell system of the present teachings can be configured to exploit the exhaust streams from the fuel cell units. For example, the exhaust streams such as heated afterburner combustion product streams from adjacent fuel cell units can be directed towards each other and/or into a channel present between the fuel cell units. Components and fluid streams of the fuel cell system requiring heat can be placed or positioned in the channel to take advantage of the heat from the opposed exhaust streams. If more than two fuel cell units are present in the fuel cell system, the additional fuel cell units can be placed or positioned appropriately to combine their exhaust streams with the others, if desired.

In these designs and configurations, the fuel cell units can be within a thermally-shielded zone or a thermally-regulated zone, but not necessarily. A fuel cell unit of the present teachings can define a thermally-shielded zone, for example, where a liquid heat-exchange plate or a liquid heat-exchange jacket encompasses a substantial portion of a fuel cell unit such as its exterior faces or surfaces and the inlet and the outlet of the liquid heat-exchange plate or the liquid heat-exchange jacket function as the temperature-regulating fluid inlet and exhaust fluid outlet, respectively, of the thermally-shielded zone. A fuel cell unit of the present teachings can define a thermally-regulated zone, for example, where a liquid heat-exchange plate or a liquid heat-exchange jacket encompasses a substantial portion of a fuel cell unit such as its exterior faces or surfaces. A liquid heat-exchange jacket can be a retaining structure for a fuel cell unit where the thermal insulation around a reformer, a fuel cell stack and an afterburner can be maintained in place by the liquid heat-exchange jacket. A liquid heat-exchange plate or a liquid heat-exchange jacket can be in thermal contact to varying degrees with one or more components of a fuel cell unit depending on the level of thermal control desired for a particular application.

A fuel cell unit of the present teachings can be designed and configured to preferentially transfer heat from one or more faces and/or one or more surfaces of the fuel cell unit. For example, where thermal insulation is present around or substantially around a fuel cell unit (e.g., creating a thermal zone, which can be a thermally-shielded zone), a reduced level of thermal insulation can be in contact with, adjacent to, and/or in thermal communication with a face or a surface of the fuel cell unit thereby to increase heat transfer through or from that face or that surface. In the design and configuration of a fuel cell system and an array of fuel cell units, a reduced level of thermal insulation can be on, adjacent to and/or a thermal communication with the appropriate faces or surfaces of the fuel cell units to achieve efficient and effective heat transfer among the array of units. In certain cases, a fuel cell unit can have one, two, three, four, five, six or more faces or surfaces, depending on the shape and/or design of fuel cell unit, which faces, segments thereof, or surfaces can preferentially transfer heat in this way.

Indeed the design of the fuel cell units and systems of the present teachings permits the exploitation of many of the thermal management features described herein, in various combinations, which can reduce the footprint or package of the overall system. For example, a reduced level of thermal insulation in contact with, adjacent to, and/or in thermal communication with at least one face or one surface of a fuel cell unit (e.g., of a fuel cell stack and/or an afterburner) can be associated with, for example, be in thermal communication with, a liquid heat-exchange plate or a liquid heat-exchange jacket thereby to transfer preferentially heat from the at least one face or one surface of the fuel cell unit to a heat-exchange liquid. Moreover, in addition to radiant heat from components of the fuel cell unit, heated exhaust streams, for example, from the afterburner, can be directed over, adjacent to and/or in (thermal) contact with a liquid heat-exchange plate or heat-exchange jacket to provide two sources of heat for the heat-exchange liquid. Such an arrangement or configuration can reduce or minimize space requirements while increasing or maximizing heat transfer and management.

The fuel cell systems described herein also can be operated as CHP systems where a fuel cell unit and a heater unit are included in the CHP system. A heater unit can be envisioned as a catalytic burner that can assist in maintaining a consistent heat and power output. That is, similar to a fuel cell unit, a heater unit can convert gaseous reformable fuels into heat but without the production of electricity. The use of a heater in conjunction with a fuel cell can separate the heat output from the electrical output of the CHP system. The fuel cell unit and the heater unit can be operated independently via a user interface to produce heat output only at a desired output level, an electrical power with no additional heat output, or an electrical output with additional heat output at a desired output level. Thus, a more consistent heat and power output can be realized with a CHP system as the various components of the system can be operated and adjusted as needed to maintain the desired balance.

Although the present teachings focus on and describe fuel cell systems and CHP systems that can be designed and constructed as a single, fixed structure, the present teachings also encompass fuel cell systems and CHP systems that can be modular in design. That is, the fuel cell system can include individual fuel cell units and/or heater units that can be added or removed from a system for design flexibility and adaptation of the system for a particular application, for example, to increase or decrease power output. For example, a fuel cell unit and/or heater unit can be connected to or disconnected from preexisting, supporting structure include can include one or more common conduits such as a common (reformable) fuel source conduit and a common liquid heat-exchange conduit, where such common conduits can have multiple ports or interfaces for quick connection and disconnection of the fuel cell unit(s) and/or the heater unit(s). The design of the systems described herein also can permit the logical control of the flow paths of fluids throughout the system including individual fuel cell units, if appropriate. That is, the fluid circuit in individual fuel cell units and/or heater units as well as in fuel cell systems and CHP systems can be customized for a particular application or situation such as the start-up or shut-down of a single fuel cell unit among an array of fuel cell units.

Throughout the application, where compositions are described as having, including, or comprising specific components, or where processes are described as having, including, or comprising specific process steps, it is contemplated that compositions of the present teachings also consist essentially of, or consist of, the recited components, and that the processes of the present teachings also consist essentially of, or consist of, the recited process steps.

In the application, where an element or component is said to be included in and/or selected from a list of recited elements or components, it should be understood that the element or component can be any one of the recited elements or components, or the element or component can be selected from a group consisting of two or more of the recited elements or components.

Further, it should be understood that elements and/or features of a composition, an apparatus, or a method described herein can be combined in a variety of ways without departing from the spirit and scope of the present teachings, whether explicit or implicit herein. For example, where reference is made to a particular structure, that structure can be used in various embodiments of apparatus of the present teachings and/or in methods of the present teachings, unless otherwise understood from the context. In other words, within this application, embodiments have been described and depicted in a way that enables a clear and concise application to be written and drawn, but it is intended and will be appreciated that embodiments may be variously combined or separated without parting from the present teachings and invention(s). For example, it will be appreciated that all features described and depicted herein can be applicable to all aspects of the invention(s) described and depicted herein.

It should be understood that the expression "at least one of" includes individually each of the recited objects after the expression and the various combinations of two or more of the recited objects unless otherwise understood from the context and use. The expression "and/or" in connection with three or more recited objects should be understood to have the same meaning unless otherwise understood from the context. For example, "in contact with, adjacent to, and/or in thermal communication with" can mean "in contact with" or "adjacent to" or "in thermal communication with" or "in contact with and in thermal communication with" or "adjacent to and in thermal communication with" or "in contact with and adjacent to," although the latter phrase in the latter expression may be considered redundant.

The use of the term "include," "includes," "including," "have," "has," "having," "contain," "contains," or "containing," including grammatical equivalents thereof, should be understood generally as open-ended and non-limiting, for example, not excluding additional unrecited elements or steps, unless otherwise specifically stated or understood from the context.

The use of the singular herein, for example, "a," "an," and "the," includes the plural (and vice versa) unless specifically stated otherwise.

Where the use of the term "about" is before a quantitative value, the present teachings also include the specific quantitative value itself, unless specifically stated otherwise. As used herein, the term "about" refers to a ±10% variation from the nominal value unless otherwise indicated or inferred.

It should be understood that the order of steps or order for performing certain actions is immaterial so long as the present teachings remain operable. Moreover, two or more steps or actions may be conducted simultaneously.

At various places in the present specification, values are disclosed in groups or in ranges. It is specifically intended that the description include each and every individual subcombination of the members of such groups and ranges and any combination of the various endpoints of such groups or ranges. For example, an integer in the range of 0 to 40 is specifically intended to individually disclose 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40, and an integer in the range of 1 to 20 is specifically intended to individually disclose 1, 2, 3, 4, 5, 6, 7, 8, 9, 10, 11, 12, 13, 14, 15, 16, 17, 18, 19, and 20.

The use of any and all examples, or exemplary language herein, for example, "such as," "including," or "for example," is intended merely to illustrate better the present teachings and does not pose a limitation on the scope of the invention unless claimed. No language in the specification should be construed as indicating any non-claimed element as essential to the practice of the present teachings.

Terms and expressions indicating spatial orientation or altitude such as "upper," "lower," "top," "bottom," "horizontal," "vertical," and the like, unless their contextual usage indicates otherwise, are to be understood herein as having no structural, functional or operational significance and as merely reflecting the arbitrarily chosen orientation of the various views of apparatus, devices, components, and features of the present teachings that may be illustrated in certain of the accompanying figures.

As used herein, "liquid reformable fuel" refers to and includes reformable carbon- and hydrogen-containing fuels that are a liquid at standard temperature and pressure (STP) conditions, for example, methanol, ethanol, naphtha, distillate, gasoline, kerosene, jet fuel, diesel, biodiesel, and the like, that when subjected to reforming undergo conversion to hydrogen-rich reformates. The expression "liquid reformable fuel" shall be further understood to include such fuels whether they are in the liquid state or in the gaseous state, i.e., a vapor.

As used herein, "gaseous reformable fuel" refers to and includes reformable carbon- and hydrogen-containing fuels that are a gas at STP conditions, for example, methane, ethane, propane, butane, isobutane, ethylene, propylene, butylene, isobutylene, dimethyl ether, their mixtures, such as natural gas and liquefied natural gas (LNG), which are mainly methane, and petroleum gas and liquefied petroleum gas (LPG), which are mainly propane or butane but include all mixtures made up primarily of propane and butane, and the like, that when subjected to reforming undergo conversion to hydrogen-rich reformates. A gaseous reformable fuel also includes ammonia, which like other gaseous reformable fuels, can be stored as a liquid.

As used herein, a "reformable fuel" refers to a liquid reformable fuel and/or a gaseous reformable fuel.

As used herein, a "fuel cell stack" refers to the component of a fuel cell unit or fuel cell system where the electrochemical reaction takes place to convert hydrogen or electrochemically-oxidizable species to electricity. The fuel cell stack includes an anode, a cathode, and an electrolyte, often formed in layers. In operation, hydrogen and any other electrochemically oxidizable component(s) of a reformate entering a fuel cell stack, for example, from a reformer and/or a fluid mixing device of the present teachings, combine with oxygen anions within an anode layer of the fuel cell stack to produce water and/or carbon dioxide and electrons. The electrons generated within the anode layer migrate through the external load and back to the cathode layer where oxygen combines with the electrons to provide oxygen anions which selectively pass through the electrolyte layer and the anode layer.

As used herein, a "fuel cell unit" generally refers to a reformer in operable fluid communication with a fuel cell stack, a fuel cell stack, and an afterburner in operable fluid communication with exhaust from the fuel cell stack. A fuel cell unit can include a vaporizer, where an outlet of the vaporizer is in operable fluid communication with an inlet of the reformer and/or the fuel cell stack. A fuel cell unit can include various valve assemblies, sensor assemblies, conduits, and other components associated with such a unit. A "fuel cell system" generally refers to a fuel cell unit and the balance of plant. A fuel cell system often includes a plurality of fuel cell units. A plurality of fuel cell units can share the balance of plant. However, it should be understood that a "fuel cell unit" and a "fuel cell system" can be used interchangeably herein unless the context dictates otherwise. Moreover, known and conventional fuel cells come in a variety of types and configurations including phosphoric acid fuel cells (PAFCs), alkaline fuel cells (AFCs), polymer electrolyte membrane (or proton exchange membrane) fuel cells (PEMFCs), and solid oxide fuel cells (SOFCs).

As used herein, a "combined heat and power system" or "CHP system" generally refers to a system that generates electricity and useable heat. A CHP system generates electricity and in doing so, can produce heat that can be captured and used in a variety of ways rather than be discarded as waste heat. Certain types of fuel cell systems can be CHP systems, depending on whether the reforming, electrochemical, and other chemical reactions generate heat, i.e., are exothermic. In such systems, the thermal output typically depends on the electrical output of the fuel cell unit(s). A CHP system can include one or more fuel cell units. A CHP system can include one or more fuel cell units integrated with one or more heater units, and the balance of plant. In such systems where one or more heater units are present, the thermal output can be independent of the electrical output. Accordingly, such a CHP system can provide, at desired levels, a thermal output only, an electrical output only, or both thermal and electrical outputs.

As used herein, a "thermally-shielded zone" refers to a volume that can be thermally controlled independent of the ambient environment and/or other adjacent volume(s) outside of the thermally-shielded zone. A thermally-shielded zone can include a "thermally-isolated zone;" however, a thermally-shielded zone typically has one or more temperature-regulating fluid inlets and one or more exhaust fluid outlets, where the inlet(s) and the outlet(s) provide fluid communication such as operable fluid communication between the interior and the exterior of the thermal zone, so that a thermally-shielded zone is not completely isolated thermally from the ambient environment. A thermally-shielded zone has no or substantially no heat transfer occur through and/or from a face or a surface of the structure defining the thermally-shielded zone other than through the one or more temperature-regulating fluid inlets, one or more exhaust fluid outlets, and any other conduits traversing the thermally-shielded zone that deliver fluids to and from a fuel cell unit and associated components, for example, to permit operation of the fuel cell unit such as an anode reactants conduit, a cathode air conduit, and an exhaust conduit.

A thermally-shielded zone can be created with a box or a box-like structure over a fuel cell unit, where the box or the box-like structure can have one or more temperature-regulating fluid inlets and one or more exhaust fluid outlets. In such a case, the barriers or walls of the box or the box-like structure can define the thermally-shielded zone. In various embodiments, a thermally-shielded zone can be created in various shapes and/or configurations using thermally non-conductive materials, for example, thermal insulation materials such as sheets of solid thermal insulation material, to form and define a volume that is thermally shielded from the ambient environment but for temperature-regulating fluid inlet(s) and exhaust fluid outlet(s). In some embodiments, a thermally-shielded zone can be defined by the fuel cell unit itself, for example, where a liquid heat-exchange plate or a liquid heat-exchange jacket is in thermal communication with the fuel cell unit. In these cases, the liquid heat-exchange plate or the liquid heat-exchange jacket typically will be in thermal communication with the entire or substantially the entire fuel cell unit, for example, surrounding or encompassing the fuel cell unit, at least on its exposed vertical surfaces.

As used herein, a "thermally-regulated zone" refers to a volume that can be thermally controlled independent of the ambient environment and/or other adjacent volume(s) outside of the thermally-regulated zone but for which heat transfer can occur through and/or from a face, a segment thereof, or a surface of the thermally-regulated zone. A thermally-regulated zone can have one or more temperature-regulating fluid inlets and one or more exhaust fluid outlets. In various embodiments, a thermally-regulated zone can permit preferential heat transfer to occur from the thermally-regulated zone, for example, by having different amounts or levels of thermal insulation present that define the thermally-regulated zone. For example, certain portions or areas of one or more faces or surfaces defining a thermally-regulated zone can include a reduced level of thermal insulation to permit preferential heat transfer as described herein.

Preferential heat transfer can be facilitated by a source of positive gas pressure in operable fluid communication with one or more temperature-regulating fluid inlets of a thermally-regulated zone. In such cases, the source of positive gas pressure such as a fan, a blower or a compressor can move air within the thermally-regulated zone to an exhaust fluid outlet and/or an area of reduced thermal insulation. A thermally-regulated zone can be created similar to the creation of a thermally-shielded zone but with less stringent requirements to prevent heat transfer through and/or from a surface or a face or a segment of a face of the thermally-regulated zone. That is, preferential heat transfer from a face, or segment thereof, or a surface of a fuel cell unit and the adjacent face, segment or surface of the structure (e.g., solid thermal insulation) defining the thermally-regulated zone typically is the desired result with a thermally-regulated zone.

As used herein, "in operable fluid communication with" refers to fluid communication between or among various components and/or structure when the components and/or structure are in an operative or active state or position; however, fluid communication can be interrupted when the components and/or structure are in an inoperative or inactive state or position. Operable fluid communication can be controlled by a valve assembly positioned between or among components and/or structure. For example, if A is in operable fluid communication with B via a valve assembly, then fluid can flow or be delivered from A to B when the valve assembly is "open" thereby permitting fluid communication between A and B. However, fluid communication between A and B can be interrupted or ceased when the valve assembly is "closed." In other words, the valve assembly is operable to provide fluid communication between A and B. It should be understood that fluid communication can include various degrees and rates of fluid flow and related characteristics. For example, a fully-opened valve assembly can provide fluid communication between or among components and/or structure as can the valve assembly when it is partially-closed; however, the fluid flow characteristics such as flow rate can be affected by the different positions of the valve assembly. As used herein, "in operable fluid communication with" and "in fluid communication with" can be used interchangeably unless the context dictates otherwise.

As used herein, "in thermal communication with" refers to thermal communication between or among various components and/or structure such that heat transfer can occur between or among the components and/or structure. Although components and structure typically in thermal communication remain in thermal communication, where the thermal communication can be interrupted, for example, ceasing the flow of heated fluids to components and/or structure or placing an insulation barrier or structure between or among components and/or structure, "in operable thermal communication with" can be a more appropriate expression similar to the expression and meaning of "in operable fluid communication with." However, as used herein, "in thermal communication with" and "in operable thermal communication with" can be used interchangeably unless the context dictates otherwise.

As used herein, to "control the flow," "control the delivery," "adjust the flow," and "adjust the delivery" of a fluid, including grammatical equivalents and equivalent expressions and language, can be to increase the flow or delivery of fluid, to decrease the flow or delivery of fluid, to maintain a substantially constant flow or delivery of fluid, and/or to interrupt or cease the flow or delivery of fluid.

Similarly, to "control the pressure" and "adjust the pressure," including grammatical equivalents and equivalent expressions and language, can be to increase the pressure, to decrease the pressure, to maintain a substantially constant pressure, and/or to interrupt or cease the pressure. It should be understood that in many circumstances, to "control the flow" and "adjust the flow" can be to "control the pressure" and "adjust the pressure," and vice versa. In addition, "controlling," "adjusting," and "manipulating" a component of a fuel cell unit, a heater unit, a fuel cell system, or a CHP system (including grammatical equivalents and equivalent expressions and language), for example, a valve assembly or a source of positive gaseous pressure, can effect the same changes and/or steady-state operation as described above.

As used herein, a "valve assembly" refers to a structure or structures together that can monitor and/or control fluid communication and fluid flow characteristics between or among components and/or structure, for example, the delivery of a reformable fuel to a reformer or the flow of heat exchange liquid through a liquid heat exchange plate or a liquid heat-exchange jacket. A valve assembly can be a single valve or include a plurality of valves and related structure, where certain structures can be in series. A valve assembly can be or include a pressure metering assembly. For example, a valve assembly can be or include a metering valve thereby permitting digital control of the flow and delivery of fluids. A valve assembly can be or include valves in a piccolo arrangement, for example, a series of orifices, each associated with a proportional valve. A valve assembly can include a proportional valve such as a proportional solenoid valve; or a series of proportional valves such as a series of proportional solenoid valves. A valve assembly can include an on/off valve such as a solenoid valve; or a series of on/off valves, for example, a series of on/off solenoid valves. A valve assembly can include a three-way valve; a series of three-way valves; a check valve; a series of check valves; an orifice; a series of orifices; and combinations thereof and of the other valves and valve assemblies described herein, where certain of the valves and valve assemblies can be in series. Where structures or components are indicated as being in series, the components can be either in a parallel series or in a sequential series (e.g., collinear).

As used herein, a "sensor assembly" refers to any suitable sensor or sensing device or combination of sensor or sensing devices for the operating parameter(s) being monitored, measured and/or determined. For example, fuel flow rates can be monitored with any suitable flow meter, pressures can be monitored with any suitable pressure-sensing or pressure-regulating device, and temperatures can be monitored with any suitable temperature sensor. Accordingly, examples of sensor devices include flow meters, pressure meters, thermocouples, thermistors, and resistance temperature detectors. A sensor or sensing device can include a balance, a weighing scale such as a spring scale, or other device for monitoring, measuring, and/or determining the weight of an object. The sensor assemblies optionally can include a transducer in communication with the controller.

As used herein, a "source of positive gaseous pressure" or a "source of positive gas pressure" refers to device or apparatus that can produce a positive gaseous or gas pressure or cause gas movement. A source of positive gas pressure can be a positive displacement blower, pump or compressor, or a dynamic blower, pump or compressor. Examples of sources of positive gaseous or gas pressure include a fan, a plurality or series of fans, a rotary pump or compressor, such as a rotary vane pump or compressor, a plurality or a series of rotary pumps or compressors, a reciprocating pump or compressor such as a diaphragm pump or compressor, or a plurality or a series of diaphragm pumps or compressors, a blower, for example, a centrifugal blower or compressor, a plurality or series of blowers, a plurality or series of centrifugal blowers or compressors, an air pump, a container of compressed gas such as a tank of air or an inert gas, and combinations thereof. A "positive gaseous pressure" or a "positive gas pressure" can be realized from any of these sources of positive gas pressure and others known to those skilled in the art.

In operation, a pump, such as a liquid pump or a fuel pump, can circulate liquids and/or reformable fuels through the fuel cell or CHP system. For example, a pump can flow reformable fuels to a vaporizer and/or a reformer of a fuel cell unit. A pump can be used to circulate liquid, for example, water and/or a glycol, through a liquid heat-exchange plate or a liquid heat-exchange jacket. Examples of a pump such as a liquid or fuel pump include a metering pump, a rotary pump, an impeller pump, a diaphragm pump, a peristaltic pump, a positive displacement pump, a gear pump, a piezoelectric pump, an electrokinetic pump, an electroosmotic pump, and a capillary pump. The pump can control the flow rate of liquids and/or reformable fuels through a fuel cell or CHP system.

The exemplary fuel cell systems and CHP systems depicted in the figures include various conduits, for example, a cathode air conduit, an anode reactants conduit, an afterburner exhaust conduit, and the like. A fuel cell or CHP system of the present teachings can include a plurality of conduits, for example, two or more conduits, positioned to provide operable fluid communication between or among components of the fuel cell or CHP system. A plurality of conduits also can couple a fuel cell unit or fuel cell or CHP system, for example, to components common to the fuel cell or CHP system such as a vaporizer and/or reformable fuel source. That is, the components of the fuel cell or CHP systems and methods of the present teachings including peripheral components and devices can include conduits connecting or linking the components, for example, a vaporizer, a (hydrocarbon fuel) reformer, and related equipment such as valve assemblies, pumps, and sensor assemblies. Each of these components and others can include one or more of an inlet, an outlet, and a port to permit fluid communication, for example, operable fluid communication, to be established between or among the components. It also should be understood that the conduits can include other components and devices associated therewith, for example, valve assemblies, pumps, sources of positive gaseous pressure, and sensor assemblies.

The conduits or conduit system can have many specific designs, configurations, arrangements, and connections depending on many factors, for example, the particular application, the reformable fuel, and the footprint size of the overall fuel cell or CHP system. Thus, the conduit systems described and/or shown herein are merely for illustrative purposes and are not meant to limit the present teachings in any way. Moreover, where two or more conduits may be described as connected to, coupled to, or otherwise joining a component or components, for example, a valve assembly and a source of reformable fuel, a single conduit also can be envisioned as achieving the same design and/or purpose, where the component such as a valve assembly can be described as being "in-line with," "situated within," or "associated with" a single conduit. In addition, "coupled to," "connected to" or otherwise joining two or more components or structure can mean that the one component or structure is directly or indirectly coupled, connected or joined to another component or structure.

A conduit can be a duct, for example, a channel, tube or passageway for conveying a fluid. For example, a temperature-regulating fluid conduit can be used to carry or deliver a temperature-regulating fluid, for example, ambient air external to a fuel cell unit or system, through a temperature-regulating fluid inlet to a fuel cell unit within a thermally-shielded zone or a thermally-regulated zone. As another example, an exhaust conduit can be used to carry or deliver exhaust fluids away from a fuel cell unit, for example, from an afterburner to the exterior of the fuel cell unit, either within a thermally-shielded zone or a thermally-regulated zone, or outside or exterior to such zones. A conduit can be a manifold, for example, a chamber, pipe or duct with a number of inlets or outlets used to collect or distribute a fluid. As used herein, a "common conduit" generally refers to a multi-ported conduit for fluid delivery to and/or from specific locations.

A fuel cell unit, a fuel cell system, a heater unit, and a CHP system of the present teachings can include a control system for automating the operations of the individual units, components thereof, and/or of the overall system. A control system can include control components, for example, control electronics, actuators, valve assemblies, sensor assemblies, and other structure and devices to monitor, control and/or adjust the operation of an individual fuel cell unit or heater unit; one or more components thereof such as a vaporizer, a reformer, a fuel cell stack and an afterburner; a fuel cell system or a CHP system; and one or more components thereof such as the balance of plant, for example, a source of positive gas pressure.

A control system can include a controller, which can be in communication with the various control components and components of each fuel cell unit and/or heater unit. The control system and/or controller can monitor and logically control the flow path of fluids (e.g., liquid and gaseous reactants such as reformable fuel, an oxygen-containing gas and steam; air such as temperature-regulating air, radiated heated air, and cathode air; exhaust streams; and heat-exchange liquid) through individual components of a fuel cell unit or a heater unit, through individual fuel cell units or heater units, and through a fuel cell system or a CHP system. In other words, a custom fluid circuit can be achieved in a fuel cell system or a CHP system using a control system.

For example, in various embodiments, a fuel cell unit can be coupled to a common fuel source conduit and/or a common liquid heat-exchange conduit. Such coupling can occur while the fuel cell system is not operating. However, such coupling can occur when the fuel cell system is operating, for example, to swap out an inefficiently functioning fuel cell unit. In the latter case, the coupling can occur to the common conduits without initiating the delivery of fuel and/or heat-exchange liquid to the newly-coupled fuel cell unit until desired.

In addition, because the newly-coupled fuel cell unit is of ambient temperature, the start-up mode for that fuel cell unit can be operated independent of the operation of the other fuel cell units that are operating in steady-state mode, for example, to avoid dissipating heat from the operating fuel cell units. Accordingly, the newly-coupled fuel cell unit can be run in start-up mode, where the control system independently controls the valve assemblies and other components for the delivery of fuel, air, other fluids, and heat to that fuel cell unit until operating in a steady-state mode, when its operations can be combined with those of the already-operating fuel cell units, if desired. In the same fashion, an individual fuel cell unit of a fuel cell system can undergo a shut-down mode independent of the other operating fuel cell units thereby to permit the fuel cell system to continue to generate electricity while replacing the particular fuel cell unit.

In certain methods of the present teachings, the heated fluid streams generated by one or more operating fuel cell units such as heated heat-exchange liquid in thermal communication with such units can be diverted to a "cold" fuel cell unit such as a newly-coupled fuel cell unit in a fuel cell or CHP system to facilitate start-up of the "cold" fuel cell unit. That is, the heated fluid streams from the operating fuel cell units can be directed to or partially diverted to a "cold package" to assist in heating the various components of a fuel cell unit, for example, one or more of the reformer, the fuel cell stack, and the afterburner, while in start-up mode. Likewise, heated heat-exchange liquid associated with operating fuel cell unit(s) can be directed to or partially diverted to a liquid heat-exchange plate or a liquid heat-exchange jacket in thermal communication with one or more components of the cold fuel cell unit to provide heat to the outside of one or more components of the fuel cell unit. The use of heat from the operating units, whether heated gaseous streams and/or heated heat-exchange liquid can reduce start-up times for the cold fuel cell unit, for example, assisting in initiating catalytic activity within one or more components of the fuel cell unit.

As can be inferred from the foregoing, a fuel cell unit can include fuel cell unit control components that can be configured or adapted to communicate and control operations within the fuel cell unit. A fuel cell or CHP system can include fuel cell system control components or CHP system control components, respectively, that can be configured or adapted to communicate among the individual fuel cell units and heater units, if present, and control the operations of the fuel cell or CHP system. The fuel cell system control components and the CHP system control components can be in communication with the individual fuel cell units and heater units, if present.

The control system can include a one or more sensors or sensor assemblies in communication with a controller. In response to input signals from the sensor assemblies, user commands from a user-input device and/or programmed subroutines and command sequences, a controller can manage independently the operations of one or more fuel cell units and/or heater units, or of the overall fuel cell or CHP system. The controller can be software operating on a processor. However, it is within the scope of the present teachings to employ a controller that is implemented with one or more digital or analog circuits, or combinations thereof.

The sensor assemblies can, but do not necessarily, include a transducer in communication with the controller. The communication pathways will ordinarily be wired electrical signals but any other suitable form of communication pathway can also be employed. That is, the sensor assemblies, control signal-receiving devices, and communication pathways herein can be of any suitable construction. A wireless communication pathway can be used, such as a Bluetooth connection. The wireless communication pathway(s) can be part of a wireless network that uses wireless data connections for connecting network nodes. A combination of wired and wireless communication pathways can be used.

A fuel cell unit typically includes power conditioning components that can be configured or adapted to convert the electrical output of a fuel cell stack into a regulated electrical output of the fuel cell unit. Power conditioning components, which can be referred to as power handling components or power management components, can include current collection plates and/or bus bars that can carry the electrical current away from the fuel cell stack and deliver it external to the fuel cell unit. Power conditioning components typically are located close to the fuel cell stack where the electricity is generated. As such, power conditioning components can be exposed to the high operating temperatures of the fuel cell stack and the fuel cell unit. Nevertheless, heat transfer away from such components such as with the use of a liquid heat-exchange plate or a liquid heat-exchange jacket adjacent to or around a fuel cell unit and/or at least adjacent to the power conditioning components can reduce the electrically resistive losses.

In contrast, the electronics of a fuel cell system associated with a control system and a controller sensor assemblies and/or valve assemblies for monitoring and operating the various components of a fuel cell unit, fuel cell system and/or CHP system typically are heat sensitive. Accordingly, such electronics typically are in thermally-protected locations or environments, for example, outside of a thermally-shielded zone including a fuel cell unit and/or adjacent to or encompassed by sufficient thermal insulation such as solid and/or liquid thermal insulation.

Accordingly, the present teachings provide a fuel cell system that can include a fuel cell unit. The fuel cell unit can include a reformer; a fuel cell stack in operable fluid communication with the reformer; and an afterburner in operable fluid communication with the fuel cell stack. The fuel cell unit can be within a thermally-shielded zone. A thermally-shielded zone can include a thermal insulation such as a solid thermal insulation, a fluid thermal insulation, or combinations thereof. A thermally-shielded zone can be defined by a thermal insulation such as a solid thermal insulation, a fluid thermal insulation, or combinations thereof. Each thermally-shielded zone can include a temperature-regulating fluid inlet and one or more exhaust fluid outlets. A source of positive gaseous pressure can be in operable fluid communication with the temperature-regulating fluid inlet and one or more of the reformer, the fuel cell stack and the afterburner.

A fuel cell system can include a first fuel cell unit and a second fuel cell unit. The first fuel cell unit and the second fuel cell unit independently can be a fuel cell unit of present teachings. A fuel cell system can include more than two fuel cell units, for example, three, four, five, six or more fuel cell units.

A fuel cell unit, or independently each of the first fuel cell unit, second fuel cell unit, and any higher order fuel cell unit can include a cathode air conduit in operable fluid communication with a cathode of the fuel cell stack and configured to deliver cathode air (an oxygen-containing gas) to the cathode. A fuel cell unit, or independently each of the first fuel cell unit, second fuel cell unit, and any higher order fuel cell unit can include an anode reactants conduit in operable fluid communication with an anode of the fuel cell stack and configured to delivery one or more of anode air, an oxidant such as steam, and a (reformed) reformable fuel to the anode. In certain embodiments, a reformable fuel can be delivered directly to an anode of a fuel cell stack prior to being reformed. In such cases, a reforming catalyst is incorporated into the anode (fuel) electrodes of the fuel cell stack such that "on-cell" reforming can occur. A fuel cell unit, or independently each of the first fuel cell unit, second fuel cell unit, and any higher order fuel cell unit can include an exhaust conduit in thermal and operable fluid communication with the afterburner and configured to exhaust heated combustions products from the afterburner.

The exhaust conduit includes an upstream end and a downstream end. The downstream end of the exhaust conduit can terminate within the thermally-shielded zone. In such embodiments and other embodiments of the present teachings, the fuel cell unit, or independently each of the first fuel cell unit, the second fuel cell unit and any higher order fuel cell units, can include a vaporizer in thermal communication with heated afterburner combustion products and in operable fluid communication with the reformer.

In various embodiments, the downstream end of the exhaust conduit can terminate outside of the thermally-shielded zone. In these and related embodiments, where the fuel cell system includes at least a first fuel cell unit and a second fuel cell unit, the downstream end of the exhaust conduit of first fuel cell unit can be directed towards the downstream end of the exhaust conduit of the second fuel cell unit whereby the exhaust streams from each fuel cell unit are configured to combine. The heated afterburner combustion products from the exhaust conduits can be directed to heat other components of the fuel cell system outside of the thermally-shielded zones, for example, a vaporizer, reformable fuel, cathode air, and anode air. The heated afterburner combustion products from the exhaust conduits can be directed to and/or be in thermal communication with a heat-exchange liquid such as a heat-exchange liquid in a liquid heat-exchange plate or a liquid heat-exchange jacket.

In some embodiments, a fuel cell system can include at least a first fuel cell unit and a second fuel cell unit, where each fuel cell unit can include a reformer; a fuel cell stack in operable fluid communication with the reformer; and an afterburner in operable fluid communication with the fuel cell stack.

Thermal insulation such as solid thermal insulation and/or fluid thermal insulation can be distributed about the fuel cell unit such that a reduced level of thermal insulation can be in contact with, adjacent to, and/or in thermal communication with at least one face, a segment thereof, or one surface of the first fuel cell unit, for example, adjacent to at least the fuel cell stack of the first fuel cell unit and/or the fuel cell stack of the second fuel cell unit, thereby to increase heat transfer through and/or from the at least one face, the segment thereof, or one surface associated with the reduced level of thermal insulation. A reduced level of thermal insulation can be present in contact with, adjacent to, and/or in thermal communication with one or more faces or surfaces of one or more of a reformer, a fuel cell stack, an afterburner, and a vaporizer, if present.

In certain embodiments, at least one face or one surface of the first fuel cell unit associated with a reduced level of thermal insulation can be opposed to at least one face or one surface of the second fuel cell unit associated with a reduced level of thermal insulation.

In particular embodiments, where the fuel cell system further includes a third fuel cell unit, and the first fuel cell unit, the second fuel cell unit and the third fuel cell unit are in series, at least one face or one surface of the first fuel cell unit associated with a reduced level of thermal insulation can be opposed to at least one face or one surface of the second fuel cell unit associated with a reduced level of thermal insulation and a second face or surface of the second fuel cell unit associated with a reduced level of thermal insulation can be opposed to at least one face or one surface of the third fuel cell unit associated with a reduced level of thermal insulation.

In such and other embodiments of the present teachings, the second fuel cell unit can include a third face or surface associated with a reduced level of thermal insulation, i.e., where a reduced level of thermal insulation can be in contact with, adjacent to, and/or in thermal communication with a third face or surface of the second fuel cell unit.

In some embodiments including the configurations described above, the first, second and third fuel cell units can define a first set of fuel cell units and the fuel cell system further can include a second set of fuel cell units. The second set of fuel cell units can be substantially similar to the first set of fuel cell units and can be positioned such that the third face of the second fuel cell unit of the first set of fuel cell units is opposed to the third face of the second fuel cell unit of the second set of fuel cell units.

In designs and embodiments including a reduced level of thermal insulation on or adjacent to one or more faces, segments thereof, or surfaces of a fuel cell unit, the fuel cell unit(s) can be within a thermally-regulated zone. The thermally-regulated zone can include a temperature-regulating fluid inlet and one or more exhaust fluid outlets. The thermally-regulated zone can include a source of positive gas pressure in operable fluid communication with the temperature-regulating fluid inlet(s) and one or more of the reformer, the fuel cell stack, and the afterburner. The thermally-regulated zone can include a solid thermal insulation, a fluid thermal insulation, or combinations thereof. The thermally-regulated zone can be defined by a solid thermal insulation, a fluid thermal insulation, or combinations thereof.

Each of the first fuel cell unit and the second fuel cell unit independently can include a cathode air conduit in operable fluid communication with a cathode of the fuel cell stack and configured to deliver cathode air to the cathode. Each of the first fuel cell unit and the second fuel cell unit independently can include an anode reactants conduit in operable fluid communication with an anode of the fuel cell stack and configured to delivery one or more of anode air, an oxidant, and reformable fuel to the anode. Each of the first fuel cell unit and the second fuel cell unit independently can include an exhaust conduit in thermal and operable fluid communication with the afterburner and configured to exhaust heated afterburner combustion products from the afterburner.

In various embodiments, the exhaust conduit includes an upstream end and a downstream end, where the downstream end of the exhaust conduit terminates within the thermally-regulated zone. In some embodiments, the exhaust conduit includes an upstream end and a downstream end, where the downstream end of the exhaust conduit terminates outside the thermally-regulated zone. In certain embodiments, the downstream end of the exhaust conduit of a first fuel cell unit can be directed towards the downstream end of the exhaust conduit of a second fuel cell unit whereby the exhaust streams from each fuel cell unit are configured to combine, which can be in a channel between the fuel cell units thereby creating a "heated zone."

Each of a first fuel cell unit and a second fuel cell unit independently can include a vaporizer in thermal communication with the heated afterburner combustion products and in operable fluid communication with their respective reformers.

In various embodiments, a fuel cell system of the present teachings includes at least a first fuel cell unit and a second fuel cell unit, where each fuel cell unit independently includes a reformer; a fuel cell stack in operable fluid communication with the reformer; an afterburner in operable fluid communication with the fuel cell stack; and an exhaust conduit in thermal and operable fluid communication with the afterburner. The exhaust conduit includes an upstream end and a downstream end. The downstream end of the exhaust conduit of first fuel cell unit can be directed towards the downstream end of the exhaust conduit of the second fuel cell unit whereby the exhaust streams from each fuel cell unit are configured to combine.

A source of positive gaseous pressure can be located between the first and the second fuel cell units, and in operable fluid communication with the exhaust conduits and exhaust streams from each fuel cell unit whereby the exhaust streams, for example, containing heated afterburner combustion products, can be moved or directed to other components of the fuel cell system and/or exhausted from the fuel cell system. A fuel cell system further can include two or more sources of positive gaseous pressure in fluid communication with the exhaust conduits to control better the thermal environment of the fuel cell system.

For example, the exhaust conduit of each fuel cell unit can be configured to exhaust heated fluid such as heated afterburner combustion products from the afterburner to at least one of a vaporizer, a common (reformable) fuel source conduit, a common cathode air conduit, and a source of liquid such as a liquid reformable fuel or water (for generating steam). At least one of the vaporizer, the common (reformable) fuel source conduit, the common cathode air conduit, and the source of liquid can be positioned in a channel between the first fuel cell unit and the second fuel cell unit, and the exhaust conduits can be configured to exhaust heated fluid (combustion products) from the afterburner into the channel. The heated fluids exhausted into the channel between the fuel cell units can create a "heated zone" whereby the heat can be used to heat one or more of the vaporizer, the common (reformable) fuel source conduit, the common cathode air conduit, and the source of liquid. In addition, the fuel cell units can include a reduced level of thermal insulation on the face, a segment thereof, or a surface that is facing the channel to increase the heat transfer into the channel. In certain embodiments, the common fuel source conduit or a source of liquid such as a liquid reformable fuel reservoir or other structure can include a heat-activated absorbent to remove contaminants such as sulfur from the (reformable) fuel as it passes through the heated zone or channel.

A fuel cell system further can include two or more sources of positive gaseous pressure in fluid communication with the exhaust conduits and the channel. The two or more sources of positive gaseous pressure can be configured independently to control the delivery of heated fluid from the exhaust conduits into the channel.

In various embodiments, a fuel cell unit of the present teachings can include a reformer; a fuel cell stack in operable fluid communication with the reformer; an afterburner in operable fluid communication with the fuel cell stack; and a vaporizer in thermal communication with the afterburner and in operable fluid communication with the reformer. The fuel cell unit can be within a thermally-shielded zone. The thermally-shielded zone can include a temperature-regulating fluid inlet and one or more exhaust fluid outlets. A source of positive gaseous pressure can be in operable fluid communication with the temperature-regulating fluid inlet and one or more of the vaporizer, the reformer, the fuel cell stack and the afterburner.

The fuel cell unit can include a cathode air conduit in operable fluid communication with a cathode of the fuel cell stack; an anode air conduit in operable fluid communication with the vaporizer; and a reformable fuel conduit in operable fluid communication with the vaporizer.

The fuel cell unit can include an exhaust conduit in thermal and operable fluid communication with the afterburner. The exhaust conduit can be in thermal communication with the anode air conduit. The exhaust conduit can be in thermal communication with the vaporizer.

The various fuel cell systems and fuel cell units of the present teachings can include a liquid heat-exchange plate or a liquid heat-exchange jacket in thermal communication with one or more of a reformer, a fuel cell stack, and an afterburner of a fuel cell unit, or a first fuel cell unit, a second fuel cell unit, and any higher order fuel cell units. The liquid heat-exchange jacket can encompass one or more of the reformer, the fuel cell stack, and the afterburner of one or more fuel cell units. A liquid heat-exchange plate or a liquid heat-exchange jacket can be in thermal communication with a face or segment thereof or a surface of one or more fuel cell units associated with a reduced level of thermal insulation thereby to transfer heat preferentially from the face, the segment thereof, or the surface to a heat-exchange liquid.

It should be understood that when reference is made herein to a face of a fuel cell unit or other structure, a segment of the face of the fuel cell unit or other structure is intended to be included unless otherwise stated or inferred from the context. For example, a face of a fuel cell unit can include a reformer, a fuel cell stack and an afterburner, often in such sequential order. A segment of a face of a fuel cell unit can include one or more of the reformer or a portion of the reformer, the fuel cell stack or a portion of the fuel cell stack, and the afterburner or a portion of the afterburner. In addition, a segment of a fuel cell stack can include one or more segments as the word "a" is defined herein. That is, a segment of a face of a fuel cell stack can refer to the reformer and the afterburner, where the fuel cell stack is excluded and not part of the segment.

The liquid heat-exchange plate or the liquid heat-exchange jacket can include an interface configured to connect the liquid heat-exchange plate or the liquid heat-exchange jacket to a common liquid heat-exchange conduit of a fuel cell system. The interface between the liquid heat-exchange plate or the liquid heat-exchange jacket and the common liquid heat-exchange conduit can include a valve assembly. The valve assembly can include one or more of a quick-connect valve, a fixed orifice, and a proportional valve. Each of the quick-connect valve, the fixed orifice, and the proportional valve can be to provide operable fluid communication between the liquid heat-exchange plate or the liquid heat-exchange jacket and the common liquid heat-exchange conduit.

In the various fuel cell systems of the present teachings, where fuel cell unit includes a reformer, an interface can be configured to connect the reformer to a common fuel source conduit of the fuel cell system. The interface between the reformer and the common fuel source conduit can include a valve assembly. The valve assembly can include one or more of a quick-connect valve, a fixed orifice, and a proportional valve. Each of the quick-connect valve, the fixed orifice, and/or the proportional valve can be configured to provide operable fluid communication between the reformer and the common gaseous fuel source conduit.

The fuel cell systems and fuel cell units of the present teachings can include a control system for automating the operations of the fuel cell system such as independently each fuel cell unit and/or components thereof, for example, the source(s) of positive gaseous pressure and/or the liquid heat-exchange plate or the liquid heat-exchange jacket. The control system can include a controller in communication with one or more sensor assemblies and/or one or more valve assemblies associated with the source(s) of positive gaseous pressure and/or the liquid heat-exchange plate or the liquid heat-exchange jacket, conduits associated therewith, and/or components of each fuel cell unit. The one or more sensor assemblies independently can include a temperature sensor and/or a pressure sensor.

In some embodiments, the electronics of a fuel cell unit can be located outside of a thermally-shielded zone or outside of a thermally-regulated zone. In certain embodiments, the electronics of a fuel cell unit can be located on or adjacent to a face or a surface of a fuel cell unit not associated with a reduced level of thermal insulation (e.g., a face, segment thereof, or surface having non-reduced level of thermal insulation). In particular embodiments, the electronics of a fuel cell unit can be located on or adjacent to the opposite face or surface of the downstream end of an exhaust conduit.

The present teachings also include a CHP system. A CHP system can include one or more fuel cell systems or units of the present teachings; and a heater unit positioned adjacent to the fuel cell unit. A CHP system can include a control system for automating independently the operations of individual fuel cell units and heater units of the CHP system. The control system can include a controller in communication with one or more sensor assemblies and/or one or more valve assemblies, the one or more sensor assemblies and/or one or more valve assemblies independently associated with fuel cell unit(s) and/or heater unit(s).

Another aspect of the present teachings relates to methods of thermally managing a fuel cell system, fuel cell unit(s), and/or a CHP system. A method of thermally managing a fuel cell system can include delivering temperature-regulating fluids through a temperature-regulating fluid inlet of a thermally-shielded zone; and exhausting heated exhaust fluids through one or more exhaust fluid outlets of the thermally-shielded zone. A fuel cell unit can be within a thermally-shielded zone. The heated exhaust fluids can include heated temperature-regulating fluids. That is, the heated exhaust fluids can include temperature-regulated fluids introduced through the temperature-regulating fluid inlet that are heated as the fluids move through the thermally-shielded zone before being exhausted.

In various embodiments, delivering temperature-regulating fluids through a temperature-regulating fluid inlet of a fuel cell unit can include delivering independently temperature-regulating fluids through a temperature-regulating fluid inlet of a first fuel cell unit and through a temperature-regulating fluid inlet of a second fuel cell unit. In some embodiments, exhausting heated exhaust fluids through one or more exhaust fluid outlets of the fuel cell unit can include exhausting independently heated exhaust fluids through one or more exhaust fluid outlets of the first fuel cell unit and from one or more exhaust fluid outlets of the second fuel cell unit. The first fuel cell unit can be thermally-shielded from the second fuel cell unit. The heated exhaust fluids can include heated temperature-regulating fluids.

In particular embodiments, the methods can include exhausting within a thermally-shielded zone heated afterburner combustion products from an afterburner of a fuel cell unit. The heated exhausted fluids can include heated afterburner combustion products from the afterburner of the fuel cell unit. In certain embodiments, the methods can include heating a vaporizer with heated afterburner combustion products from an afterburner of a fuel cell unit. The methods can include heating with heated afterburner combustion products from an afterburner of a fuel cell unit anode air prior to delivery to a vaporizer. The methods can include heating with heated afterburner combustion products from the afterburner of a fuel cell unit reformable fuel prior to delivery to a vaporizer. The methods can include heating with heat from the afterburner cathode air prior to delivery to a cathode of a fuel cell unit. In the latter methods the cathode air can pass through the afterburner prior to delivery to the cathode.

In various embodiments, methods of thermally managing a fuel cell system can include exhausting heated fluid from a first fuel cell unit towards a second fuel cell unit; and exhausting heated fluid from the second fuel cell unit towards the first fuel cell unit.

Such an arrangement can be useful in a staged start-up of a plurality of fuel cell units of a fuel cell system. For example, where only one fuel cell unit initially is running or operated due to the power requirements of the application but additional power is needed, the second fuel cell unit can be started. Because the (first) operating fuel cell unit is exhausting its heated fluids towards the second (non-operating) fuel cell unit, the second fuel cell unit is already heated at least partially to facilitate its start-up and reduce the time for the second fuel cell unit to reach steady-state operation.

In some embodiments, exhausting heated fluid comprises exhausting independently heated afterburner combustion products from an afterburner of each of a first fuel cell unit and a second fuel cell unit. In some embodiments, each of the first fuel cell unit and the second fuel cell unit independently can be within a thermally-shielded zone. In particular embodiments, exhausting heated fluid can include exhausting independently heated afterburner combustion products from an afterburner of each of the first fuel cell unit and the second fuel cell unit outside a thermally-shielded zone of each of the first fuel cell unit and the second fuel cell unit, respectively.

The methods can include directing exhausted heated fluid from a first fuel cell unit and a second fuel cell unit to a channel formed by and between the first fuel cell unit and the second fuel cell unit. In particular embodiments, directing the exhausted heated fluid can include directing exhausted heated fluid such as heated afterburner combustion products to at least one of a vaporizer and a source of fluid located in the channel. The source of fluid can be a source of water. In such embodiments, the method can include heating the water for use in steam reforming.

A method of thermally managing a fuel cell system can include exhausting heated fluid from a first fuel cell unit towards a second fuel cell unit to reduce the time to initiate chemical reaction or start-up in the second fuel cell unit in comparison to the time to initiate chemical reaction or start-up in the second fuel cell unit without the benefit of exhausted, heated fluid from the first fuel cell unit.

In various embodiments, methods of thermally managing a fuel cell system can include transferring heat preferentially from a face, a segment thereof, or a surface of a fuel cell unit, where a reduced level of thermal insulation can be in contact with, adjacent to, and/or in thermal communication with the face, the segment thereof, or the surface of the fuel cell unit, for example, the face, the segment thereof, or the surface associated with one or more of an afterburner, a fuel cell stack, a reformer and a vaporizer, thereby to increase heat transfer through and/or from the face, the segment thereof, or the surface associated with the reduced level of insulation. In some embodiments, the methods can include transferring heat preferentially from a face or a surface of a first fuel cell unit; and transferring heat preferentially from a face or a surface of a second fuel cell unit, where a reduced level of thermal insulation can be in contact with, adjacent to, and/or in thermal communication with the face, the segment thereof, or the surface of the first fuel cell unit that includes the reduced level of thermal insulation and/or the face, the segment thereof, or the surface of the second fuel cell unit that includes the reduced level of thermal insulation. A reduced level of insulation can be associated with the face, segment thereof or surface of one or more or the reformer, the fuel cell stack, and the afterburner of the first fuel cell unit and of the second fuel cell unit.

The methods can include transferring heat preferentially from a face or a surface of a first fuel cell unit to a channel between the first fuel cell unit and a second fuel cell unit, and transferring heat preferentially from a face or a surface of the second fuel cell unit to the channel.

In certain embodiments, the methods can include transferring heat preferentially from a face or segment thereof or a surface of a third fuel cell unit, where a reduced level of thermal insulation can be in contact with, adjacent to, and/or in thermal communication with the face or segment thereof, or the surface of the third fuel cell unit, for example, at least the afterburner of the third fuel cell unit. In particular embodiments, a reduced level of thermal insulation can be in contact with, adjacent to, and/or in thermal communication with a second face or segment thereof or a second surface of the second fuel cell unit, for example, at least the afterburner of the second fuel cell unit. In some embodiments, the first, second and third fuel cell units can be arranged linearly, respectively, and the face or segment thereof or the surface of the first fuel cell unit can be opposed the face or segment thereof or surface of the second fuel cell unit and the second face or segment thereof or the second surface of the second fuel cell unit can be opposed the face or segment thereof or the surface of the third fuel cell unit (where the aforementioned "faces," "segments of faces," or "surfaces" can be associated with a reduced level of thermal insulation and as would be understood for other references herein to "faces," "segments of faces," or "surfaces" of fuel cell or heater unit(s) describing other embodiments).

In methods including transferring heat preferentially using a reduced level of thermal insulation, one or more of the fuel cell units can be within a thermally-regulated zone, where the thermally-regulated zone can include a temperature-regulating fluid inlet. In such cases, transferring heat preferentially can include delivering temperature-regulating fluids through the temperature-regulating fluid inlet of the thermally-regulated zone.

Various methods of the present teachings can include circulating heat-exchange liquid in thermal communication with one or more of a reformer, a fuel cell stack, and an afterburner of a fuel cell unit, to promote heat transfer from one or more of the reformer, the fuel cell stack, and the afterburner to the circulating heat-exchange liquid. The heat-exchange liquid can include water and/or a glycol. Use of a glycol can increase the boiling point of the heat-exchange liquid such that more heat can be transferred per volume of heat-exchange liquid. A glycol can include a metal such as nano-sized metal particles to increase the thermal conductivity of the glycol. The methods of circulating heat-exchange liquid can reduce or limit the temperatures of the components of a fuel cell unit to limit degradation. For example, the reformer, fuel cell stack and/or afterburner temperatures of an operating fuel cell unit can be controlled, especially during high fuel flow operating conditions, thereby to limit or reduce the degradation of the catalysts and other materials present in those components.

Certain methods of the present teachings can include circulating a heat-exchange liquid in thermal communication with at least one of the faces or segments thereof or the surfaces of a fuel cell unit, or independently a first fuel cell unit and/or a second fuel cell unit, where the faces or segments thereof or the surfaces are associated with a reduced level of thermal insulation thereby to transfer heat preferentially through and/or from the face(s) or segment(s) thereof or the surface(s) to a heat-exchange liquid.

The methods can include connecting a fuel cell unit to a common liquid heat-exchange conduit of a fuel cell system. The methods of the present teachings can include transferring heat preferentially from at least one face or one surface of a fuel cell unit to a circulating heat-exchange liquid, for example, where a liquid heat-exchange plate or a liquid heat-exchange jacket is in thermal communication with a reduced level of thermal insulation in contact with, adjacent to, and/or in thermal communication with the at least one face or segment thereof or one surface of the fuel cell unit.

The heated heat-exchange liquid in or exiting a liquid heat-exchange plate or a liquid heat-exchange jacket can be routed or delivered to various devices and/or for a variety of uses as described herein. For example, the heated heat-exchange liquid can be routed or delivered to a fluid or hydraulic circuit panel, which can direct the heated heat-exchange liquid to one or more other devices, such as by using selector valves and the like. Such an arrangement or design can facilitate efficient liquid-to-liquid heat transfer to a liquid heat sink reservoir such as a water tank. The heated heat-exchange liquid can be routed or delivered to be in thermal communication with a source of reformable fuel such a reservoir of liquid reformable fuel or a tank or container of gaseous reformable fuel to preheat the reformable fuel. For example, the heated heat-exchange liquid can be used to reduce the heat required to vaporize the liquid reformable fuel. The heated heat-exchange liquid can be routed or delivered to be in thermal communication with a tank or container of water to preheat the water prior to forming or producing steam for use in the operation of a fuel cell unit. In certain embodiments, circulating heated heat-exchange liquid from a first fuel cell unit towards a second fuel cell unit can reduce the time to initiate chemical reaction or start-up in the second fuel cell unit in comparison to the time to initiate chemical reaction or start-up in the second fuel cell unit without the benefit of the heated heat-exchange liquid from the first fuel cell unit.

Various methods of the present teachings can include connecting a fuel cell unit to a common (reformable) fuel source conduit of the fuel cell system.

Methods of the present teachings can include monitoring and controlling independently the operations of one or more of a fuel cell system, a fuel cell unit, a CHP system, and one or more components thereof, including independently one or more sources of positive gaseous pressure, a reformer, a fuel cell stack, an afterburner, a vaporizer, the various valve assemblies and sensor assemblies associated therewith, and with other components not specifically identified.

It should be understood that where reference is made to a fuel cell unit, its components, configuration and/or operation, the same components, configuration and/or operation can apply to other fuel cell units of a fuel system, for example, a first fuel cell unit, a second fuel cell unit, a third fuel cell unit, and so on.

Figure 1A:
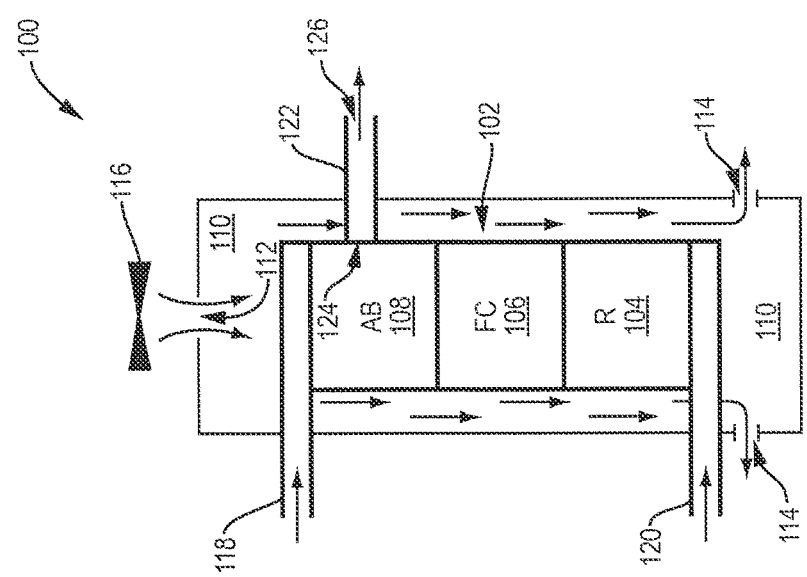
FIG. 1A is a schematic diagram of a side cross-sectional view of an embodiment of a fuel cell system of the present teachings where a fuel cell unit is within a thermally-shielded zone and the downstream end of the exhaust conduit from the afterburner terminates outside of the thermally-shielded zone.

FIG. 1A is a schematic diagram of a side cross-sectional view of an embodiment of a fuel cell system of the present teachings where a fuel cell unit is within a thermally-shielded zone and the downstream end of the exhaust conduit from the afterburner terminates outside of the thermally-shielded zone.

Referring to FIG. 1A, the fuel cell system 100 includes a fuel cell unit 102, which includes a reformer 104, a fuel cell stack 106, and an afterburner 108. The fuel cell unit is within a thermally-shielded zone 110. The thermally-shielded zone 110 includes one temperature-regulating fluid inlet 112 and one or more exhaust fluid outlets 114. A source of positive gaseous pressure 116 is in operable fluid communication with the temperature-regulating fluid inlet 112.

The fuel cell system 100 or fuel cell unit 102 includes a cathode air conduit 118 for delivering cathode air through the afterburner 108 to a cathode (not shown) of the fuel cell stack 106; an anode reactants conduit 120 for delivering one or more of anode air, an oxidant, and reformable fuel to the reformer 104 and then to an anode (not shown) of the fuel cell stack 106; and an exhaust conduit 122 for exhausting heated fluids such as heated afterburner combustion products from the afterburner 108. The exhaust conduit 122 includes an upstream end 124 in fluid communication with the afterburner 108 and a downstream end 126 that terminates outside of the thermally-shielded zone 110.

Accordingly, in operation as shown, the source of positive gaseous pressure such as a fan or blower can deliver temperature-regulating fluid, for example, fresh, ambient air, through the temperature-regulating fluid inlet and down the fuel cell unit to assist in regulating the temperature of the fuel cell unit and its components. The movement of the temperature-regulating fluid is shown by the arrows through the source of positive gaseous pressure, down the right- and left-hand sides of the fuel cell unit within the thermally-shielded zone and out the exhaust fluid outlets on the right- and left-hand side of thermally-shielded zone near its bottom. As the temperature-regulating fluid flows through the thermally-shielded zone, the fluid can increase in temperature by the heat generated by the fuel cell unit such that heated exhaust fluids flowing out of the one or more exhaust fluid outlets include heated temperature-regulating fluid.

FIG. 1B is a schematic diagram of a side cross-sectional view of an embodiment of a fuel cell system of the present teachings similar to the fuel cell system of FIG. 1A but where the downstream end of the exhaust conduit from the afterburner terminates within the thermally-shielded zone. The similar components of figures can be the same or different, for example, having various modifications associated therewith such as materials of construction, sensor assemblies, valve configurations, conduit connections and arrangement, and the like.

Referring to FIG. 1B, the fuel cell system 100' includes a fuel cell unit 102', which includes a reformer 104', a fuel cell stack 106', and an afterburner 108'. The fuel cell unit is within a thermally-shielded zone 110'. The thermally-shielded zone 110' includes more than one temperature-regulating fluid inlet 112' and one or more exhaust fluid outlets 114'. A source of positive gaseous pressure 116' is in operable fluid communication with the plurality of temperature-regulating fluid inlets 112'.

The fuel cell system 100' or fuel cell unit 102' includes a cathode air conduit 118' for delivering cathode air through the afterburner 108' to a cathode (not shown) of the fuel cell stack 106'; an anode reactants conduit 120' for delivering one or more of anode air, an oxidant, and reformable fuel to the reformer 104' and then to an anode (not shown) of the fuel cell stack 106'; and an exhaust conduit 122' for exhausting heated fluids such as heated afterburner combustion products from the afterburner 108'. The exhaust conduit 122' includes an upstream end 124' in fluid communication with the afterburner 108' and a downstream end 126' that terminates inside of the thermally-shielded zone 110'.

In operation as shown, the source of positive gaseous pressure such as a fan or blower can deliver temperature-regulating fluids, for example, fresh, ambient air, through the temperature-regulating fluid inlet and down the fuel cell unit to assist in regulating the temperature of the fuel cell unit and its components. As the temperature-regulating fluids flow down the thermally-shielded zone, they can increase in temperature by the heat generated by the fuel cell unit such that heated exhaust fluids flowing out of the one or more exhaust fluid outlets include heated temperature-regulating fluids. In addition, the heated afterburner combustion products are moved downward with the flow of the temperature-regulating fluids from the source of positive gaseous pressure. The heated afterburner combustion products can increase the temperature of the temperature-regulating fluids as well as increase the temperature within the thermally-shielded zone. Consequently, the exhaust from the afterburner can be used efficiently to assist in maintaining the operating temperature of the fuel cell unit with the temperature within each thermally-shielded zone being controlled, for example, in part, by the amount of flow of temperature-regulating fluids from the source of positive gaseous pressure. That is, for example, to reduce the temperature within a thermally-shielded zone and thus, around a fuel cell unit, the flow of temperature-regulating fluids can be increased such that the heated fluids within the thermally-shielded zone are more rapidly expelled or exhausted from the thermally-shielded zone through one or more exhaust fluid outlets.

Figure 1D:
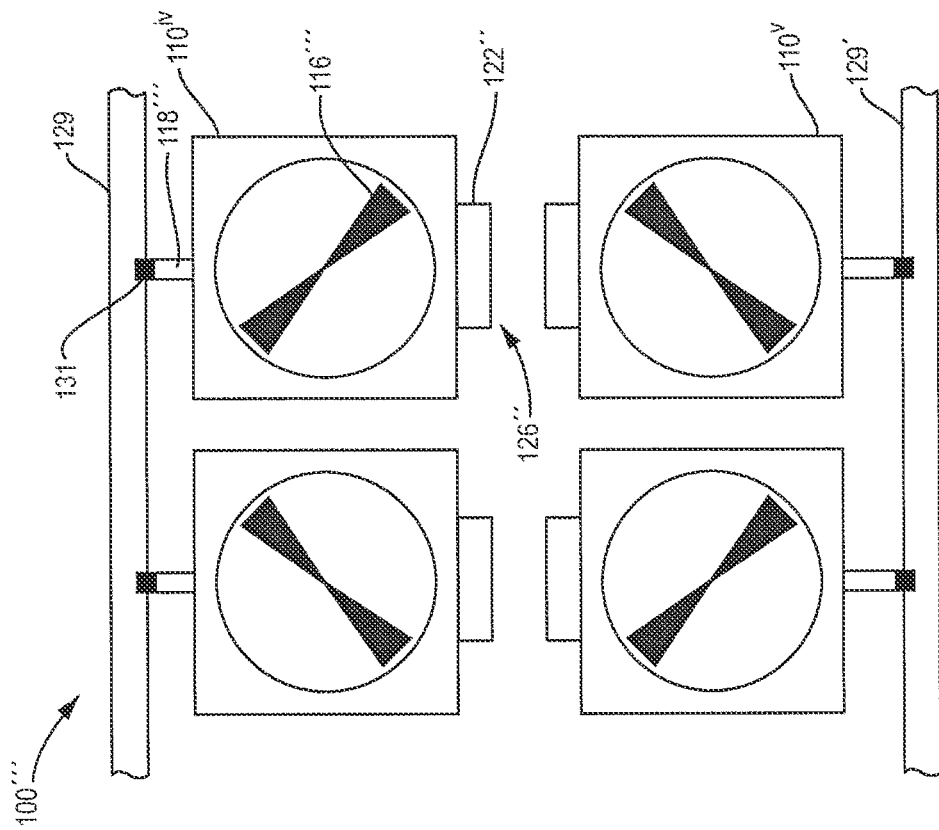
FIG. 1D is a schematic diagram of a top view of an embodiment of a fuel cell system of the present teachings depicting four fuel cell units similar to those of FIG. 1B, where the cathode air conduits of the fuel cell units are coupled to a common cathode air conduit and the exhaust conduits of adjacent fuel cell units are pointed towards each other and into a channel formed between the fuel cell units.
Figure 1C:
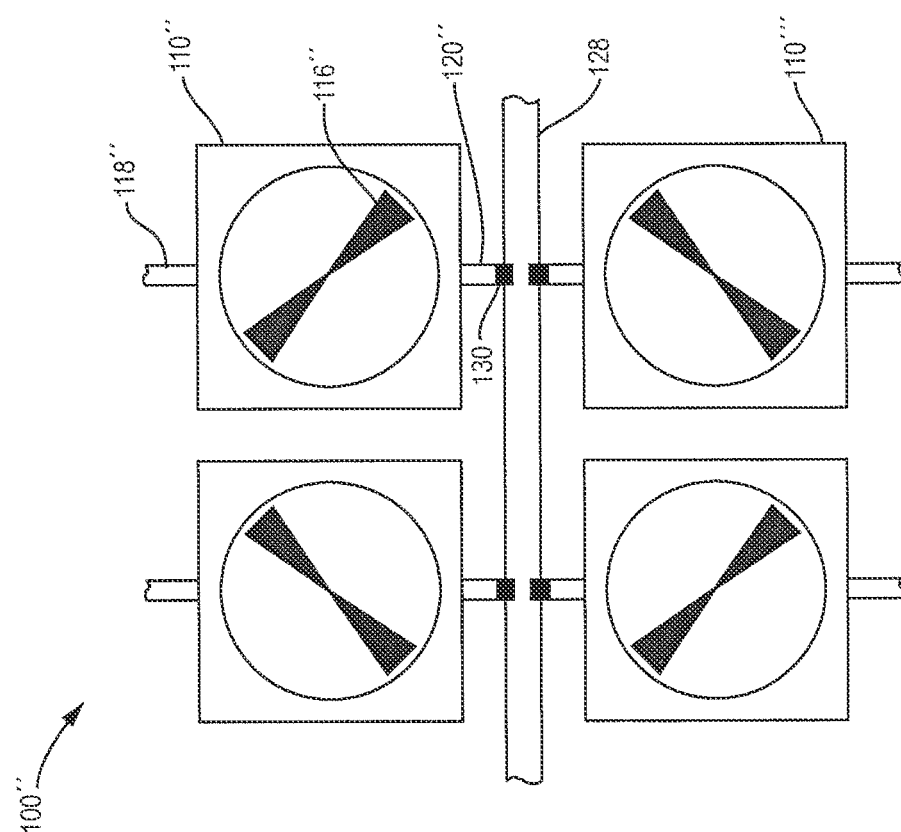
FIG. 1C is a schematic diagram of a top view of an embodiment of a fuel cell system of the present teachings depicting four fuel cell units similar to those of FIG. 1B, but where the anode reactants conduits of the fuel cell units are positioned on the opposite side of the fuel cell unit such that the anode reactants conduits are coupled to a common fuel source conduit.

FIG. 1C depicts a schematic diagram of a top view of fuel cell system 100" including four fuel cell units, where each of the fuel cell units is within a thermally-shielded zone (as shown and labeled, one fuel cell unit is within a first thermally-shielded zone 110" and another fuel cell unit is within a second thermally-shielded zone 110'''). Each of the fuel cell units of FIG. 1C is similar to the fuel cell unit shown in FIG. 1B. A source of positive gaseous pressure 116" is present at the top of each thermally-shielded zone and the exhaust conduits of the fuel cell units (not shown) terminate within the thermally-shielded zones. However, as depicted in FIG. 1C, the anode reactants conduit 120" exits the thermally-shielded zone 110" on the opposite side of the cathode air conduit 118". Such a configuration permits the anode reactants conduit 120" of each fuel cell unit to be connected or coupled to a common (reformable) fuel source conduit 128 via an interface 130. Such an arrangement can beneficially use the heat generated and/or directed to the channel between the fuel cell units to heat the common fuel source conduit and its contents.

FIG. 1D depicts a schematic diagram of a top view of fuel cell system 100''' including four fuel cell units, where each of the fuel cell units is within a thermally-shielded zone (as shown and labeled, one fuel cell unit is within a first thermally-shielded zone 110$^{iv}$ and another fuel cell unit is within a second thermally-shielded zone 110$^v$). Each of the fuel cell units of FIG. 1D is similar to the fuel cell unit shown in FIG. 1A. A source of positive gaseous pressure 116''' is present at the top of each thermally-shielded zone. The downstream end 126" of the exhaust conduit 122" terminates outside the thermally-shielded zone 110$^{iv}$. The cathode air conduit 118''' is connected or coupled to a common cathode air conduit 129 via interface 131. The anode reactants conduit (not shown as hidden in top view by the cathode air conduit) can be connected or coupled to a common fuel source conduit (also not shown as hidden in top view by the common cathode air conduit). On the opposite side or across the channel between the fuel cell units, i.e., where thermally-shielded zone 110$^v$ is located, another common cathode air conduit 129' is present, which common cathode air conduit can share the same fluid stream as or can be independent of the first-described common cathode air conduit 129. Such an arrangement can separate the thermal exhaust streams from the fuel inlet streams.

Figure 1E:
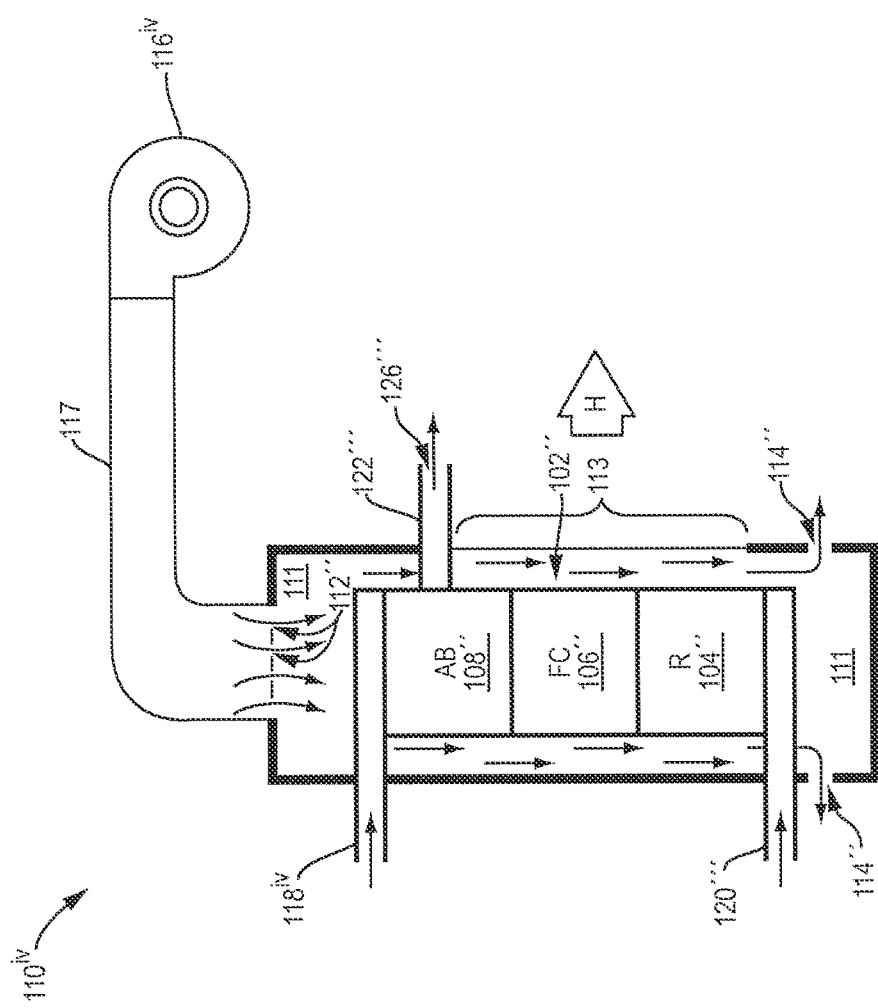
FIG. 1E is a schematic diagram of a side cross-sectional view of an embodiment of a fuel cell system of the present teachings similar to FIG. 1A, but where the fuel cell unit is within a thermally-regulated zone that has a reduced level of thermal insulation adjacent to a segment of the face of the fuel cell unit having the exhaust conduit.

FIG. 1E is a schematic diagram of a side cross-sectional view of an embodiment of a fuel cell system of the present teachings similar to FIG. 1A, but where the fuel cell unit is within a thermally-regulated zone that has a reduced level of thermal insulation adjacent to a segment of the face of the fuel cell unit having the exhaust conduit.

Referring to FIG. 1E, the fuel cell system 100' includes a fuel cell unit 102", which includes a reformer 104", a fuel cell stack 106", and an afterburner 108". The fuel cell unit is within a thermally-regulated zone 111 (which is the primary difference between the fuel cell system depicted in FIG. 1A and the fuel cell system depicted in FIG. 1E). The thermally-regulated zone 111 includes a reduced level of thermal insulation 113 adjacent to and in thermal communication with a segment of a face of the fuel cell unit, which segment includes a face or surface of the reformer, a face or surface of the fuel cell stack and a segment of the face or surface of the afterburner 108". Accordingly, heat from the thermally-regulated zone can be preferentially transferred through or from those faces, segments, and surfaces in the direction of the large arrow labeled "H." The thermally-regulated zone 111 includes more than one temperature-regulating fluid inlet 112" and one or more exhaust fluid outlets 114". A source of positive gaseous pressure (a blower) 116$^{iv}$ is in operable fluid communication with the temperature-regulating fluid inlets 112" via a conduit 117.

The fuel cell system 100'v or fuel cell unit 102" includes a cathode air conduit 118$^{iv}$ for delivering cathode air through the afterburner 108" to a cathode (not shown) of the fuel cell stack 106"; an anode reactants conduit 120''' for delivering one or more of anode air, an oxidant, and reformable fuel to the reformer 104" and then to an anode (not shown) of the fuel cell stack 106"; and an exhaust conduit 122''' for exhausting heated fluids such as heated afterburner combustion products from the afterburner 108". The exhaust conduit 122''' includes an upstream end (not labeled) in fluid communication with the afterburner 108″ and a downstream end 126‴ that terminates outside of the thermally-regulated zone 111.

The operation of the fuel cell system shown in FIG. 1E can be similar to the operation of the fuel cell system depicted in FIG. 1A and described above and herein. However, with the presence of a reduced level of thermal insulation on or adjacent to a face, a segment thereof, or a surface of one or more components of a fuel cell unit, addition heat transfer, management, and control can be achieved. In combination with other features of the present teachings described herein, and in particular, in relation to the design and arrangement of a plurality of fuel cell units of a fuel cell system, heat generated by the fuel cell units and other components can be used for other purposes to conserve the energy and heat during the operation of a fuel cell system and reduce losses of the same thereby creating more efficiently operated fuel cell units and fuel cell systems.

FIG. 2A is a schematic diagram of a side cross-sectional view of an embodiment of a fuel cell system of the present teachings depicting a fuel cell unit similar to the one shown in FIG. 1A but the afterburner, fuel cell stack and reformer are in contact with a liquid heat-exchange jacket.

Referring to FIG. 2A, the fuel cell system 200 includes a fuel cell unit 202, which includes a reformer 204, a fuel cell stack 206, and an afterburner 208. The fuel cell unit is within a thermally-shielded zone 210. The thermally-shielded zone 210 includes a temperature-regulating fluid inlet 212 and one or more exhaust fluid outlets 214. A source of positive gaseous pressure 216 is in operable fluid communication with the temperature-regulating fluid inlet 212.

The fuel cell system 200 or fuel cell unit 202 includes a cathode air conduit 218 for delivering cathode air through the afterburner 208 to a cathode (not shown) of the fuel cell stack 206; an anode reactants conduit 220 for delivering one or more of anode air, an oxidant, and reformable fuel to the reformer 204 and then to an anode (not shown) of the fuel cell stack 206; and an exhaust conduit 222 for exhausting heated fluids such as heated afterburner combustion products from the afterburner 208. The exhaust conduit 222 includes an upstream end 224 in fluid communication with the afterburner 208 and a downstream end 226 that terminates outside of the thermally-shielded zone 210.

A liquid heat-exchange jacket 232 is present and in thermal communication with the reformer 204, the fuel cell stack 206, and the afterburner 208. The liquid heat-exchange jacket 232 has a liquid heat-exchange outlet 234 and a liquid heat-exchange inlet 236. A liquid heat-exchange jacket typically will encompass and be in thermal communication with a perimeter, for example, a circumference, of one or more components of a fuel cell unit, for example, one or more of the afterburner, the fuel cell stack and the reformer. A liquid heat-exchange plate typically will be present and in thermal communication with one or more faces, segments thereof, or surfaces of one or more components of a fuel cell unit but not completely surround the perimeter or circumference, depending on the shape of the fuel cell unit. However, other variations can be used and are included in the present teachings, for example, a liquid heat-exchange jacket that encompasses the entire fuel cell unit (i.e., top, bottom and sides) but for the conduits and other components into and out of the fuel cell unit.

In operation, a heat-exchange liquid can be delivered through the liquid heat-exchange inlet, circulated through the liquid heat-exchange plate or the liquid heat-exchange jacket to promote heat transfer to the heat-exchange liquid from one or more of the afterburner, the fuel cell stack and the reformer, depending on the thermal communication between the liquid heat-exchange plate or the liquid heat-exchange jacket and those components of the fuel cell unit. The heated heat-exchange liquid can be removed from the liquid heat-exchange plate or the liquid heat-exchange jacket via the liquid heat-exchange outlet. The heated heat-exchange liquid then can be routed to one or more other devices such as a liquid-to-liquid heat exchanger, a liquid-to-gas heat exchanger, an air conditioning unit or system, and/or other device appropriate for capturing and using or otherwise expelling the heat from the heated heat-exchange liquid as described herein or known in the art or otherwise. A heat-exchange liquid can include water and/or a glycol. Use of a glycol can increase the boiling point of the heat-exchange liquid such that more heat can be transferred per volume of heat-exchange liquid.

Otherwise, the operation of the fuel cell unit of FIG. 2A is similar to the operation of the fuel cell unit in FIG. 1A but for the additional heat transfer capacity provided by the liquid heat-exchange jacket, which can assist in regulating the thermal environment in the thermally-shielded zone, for example, along with the source of positive gaseous pressure in fluid communication with the temperature-regulating fluid inlet. It should be understood that a liquid heat-exchange plate or a liquid heat-exchange jacket can be used with or be part of a fuel cell unit that is not present within a thermally-shielded zone or a thermally-regulated zone. That is, a liquid heat-exchange plate or a liquid heat-exchange jacket can be used independent of a thermally-shielded zone and a thermally-regulated zone of the present teachings. Moreover, if designed and configured appropriately, a liquid heat-exchange jacket can define a thermally-shielded zone or a thermally-regulated zone of a fuel cell unit, and/or can be a retaining structure of a fuel cell unit including any thermal insulation and/or reduced level(s) of thermal insulation, if present.

FIG. 2B is a schematic diagram of a side cross-sectional view of an embodiment of a fuel cell system of the present teachings depicting a fuel cell unit similar to the one shown in FIG. 1B but the afterburner, fuel cell stack and reformer are in contact with a liquid heat-exchange jacket.

Referring to FIG. 2B, the fuel cell system 200′ includes a fuel cell unit 202′, which includes a reformer 204′, a fuel cell stack 206′, and an afterburner 208′. The fuel cell unit is within a thermally-shielded zone 210′. The thermally-shielded zone 210′ includes a temperature-regulating fluid inlet 212′ and one or more exhaust fluid outlets 214′. A source of positive gaseous pressure 216′ is in operable fluid communication with the temperature-regulating fluid inlet 212′.

The fuel cell system 200′ or fuel cell unit 202′ includes a cathode air conduit 218′ for delivering cathode air through the afterburner 208′ to a cathode (not shown) of the fuel cell stack 206′; an anode reactants conduit 220′ for delivering one or more of anode air, an oxidant, and reformable fuel to the reformer 204′ and then to an anode (not shown) of the fuel cell stack 206′; and an exhaust conduit 222′ for exhausting heated fluids such as heated afterburner combustion products from the afterburner 208′. The exhaust conduit 222′ includes an upstream end 224′ in fluid communication with the afterburner 208′ and a downstream end 226′ that terminates inside of the thermally-shielded zone 210′.

A liquid heat-exchange plate or a liquid heat-exchange jacket 232′ is present and in thermal communication with the reformer 204′, the fuel cell stack 206′, and the afterburner 208′. The liquid heat-exchange jacket 232′ has a liquid heat-exchange outlet 234′ and a liquid heat-exchange inlet 236'. Again, the operation of the fuel cell system and fuel cell unit depicted in FIG. 2B is similar to the operation of the fuel cell unit depicted in FIG. 1B with the addition of the liquid heat-exchange plate or the liquid heat-exchange jacket, whose operation is described herein.

One advantage of the design and arrangement of components in FIG. 2B is that not only is heat transfer occurring from the exterior faces or surfaces of the components of the fuel cell unit in contact with or adjacent to the liquid heat-exchange jacket, but also the exhaust from the afterburner within the thermally-shielded zone is flowing or being delivered or moved over and in contact with the liquid heat-exchange jacket to enhance further the heat transfer from the thermally-shielded zone to the heat-exchange liquid. Other designs and configurations to take advantage of heat transfer from the exhaust of a fuel cell unit to a heat-exchange liquid are envisioned based on the present teachings, for example, a fuel cell unit within a thermally-regulated zone, or a fuel cell unit not present in a thermally-shielded zone or a thermally-regulated zone but associated with a liquid heat-exchange plate or a liquid heat-exchange jacket.

FIG. 2C is a schematic diagram of a side cross-sectional view of an embodiment of a fuel cell system of the present teachings depicting a fuel cell unit similar to the one shown in FIG. 2B except only the afterburner and fuel cell stack are in contact with a liquid heat-exchange plate or a liquid heat-exchange jacket where at least two of the faces of the afterburner and one face of the fuel cell stack include a reduced level of thermal insulation for preferential heat transfer to the liquid heat-exchange liquid.

Referring to FIG. 2C, the fuel cell system 200" includes a fuel cell unit 202", which includes a reformer 204", a fuel cell stack 206", and an afterburner 208". The fuel cell unit is within a thermally-shielded zone 210". The thermally-shielded zone 210" includes a temperature-regulating fluid inlet 212" and one or more exhaust fluid outlets 214". A source of positive gaseous pressure 216" is in operable fluid communication with the temperature-regulating fluid inlet 212".

The fuel cell system 200" or fuel cell unit 202" includes a cathode air conduit 218" for delivering cathode air through the afterburner 208" to a cathode (not shown) of the fuel cell stack 206"; an anode reactants conduit 220" for delivering one or more of anode air, an oxidant, and reformable fuel to the reformer 204" and then to an anode (not shown) of the fuel cell stack 206"; and an exhaust conduit 222" for exhausting heated fluids such as heated afterburner combustion products from the afterburner 208". The exhaust conduit 222" includes a downstream end 226" that terminates inside of the thermally-shielded zone 210".

A liquid heat-exchange plate or a liquid heat-exchange jacket 232" is present and in thermal communication with at least two faces or two surfaces of the reformer 204" and at least one face or one surface of the fuel cell stack 206". The liquid heat-exchange jacket 232" has a liquid heat-exchange outlet 234" and a liquid heat-exchange inlet 236".

A reduced level of thermal insulation 213 is present along one face of the fuel cell unit corresponding to a face or a surface of the afterburner and fuel cell stack (where a reduced level of thermal insulation is shown by a thinner black line or box vertical along the outside edges of the fuel cell unit, the black line or box representing thermal insulation generally). A reduced level of thermal insulation 213' also is present along another face or another surface of the afterburner.

Again, the operation of the fuel cell system and fuel cell unit depicted in FIG. 2B is similar to the operation of the fuel cell unit depicted in FIG. 1B with the addition of reduced levels of thermal insulation adjacent to heat generating components of the fuel cell unit and to one or more liquid heat-exchange plates or jackets, whose operation is described herein.

An advantage of the design and arrangement of components in FIG. 2C is that preferential heat transfer can occur from the exterior faces or surfaces of the afterburner and fuel cell stack having a reduced level of thermal insulation. Accordingly, heat such as radiant heat generated by the fuel cell stack and the afterburner can be preferentially transferred to the heat-exchange liquid in a liquid heat-exchange jacket or liquid heat-exchange plate in contact with or adjacent thereto thereby further enhancing the heat transfer from the fuel cell unit and permitting efficient management of the thermal environment of the fuel cell unit and/or the thermally-shielded zone.

Other designs and configurations to take advantage of preferential heat transfer from a fuel cell unit using reduced levels of thermal insulation, for example, to a heat-exchange liquid and/or to other fuel cell unit(s), are envisioned based on the present teachings, with other examples provided herein.

FIG. 2D depicts a schematic diagram of a top view of fuel cell system 200''' including a first fuel cell unit 202''' and a second fuel cell unit 202''''. Each of the fuel cell units of FIG. 2C is similar to the fuel cell unit shown in FIG. 1A where, as labeled for the first fuel cell unit, a source of positive gaseous pressure 216''' is present at the top of each thermally-shielded zone 210''' and the exhaust conduit 222''' terminates outside of the thermally-shielded zone 210'''. However, in the fuel cell units depicted in FIG. 2C, the liquid heat-exchange plate or the liquid heat-exchange jacket of each fuel cell unit is connected or coupled to a common liquid heat-exchange conduit system 238.

A common liquid heat-exchange conduit system can include a common liquid heat-exchange inlet conduit to deliver fresh heat-exchange liquid to the liquid heat-exchange plate or the liquid heat-exchange jacket. A common liquid heat-exchange conduit system can include a common liquid heat-exchange outlet conduit to remove heated heat-exchange liquid from the liquid heat-exchange plate or the liquid heat-exchange jacket. The common liquid heat-exchange outlet conduit can be in thermal communication with a reservoir of heat-exchange liquid and/or a heat sink for the transfer of the heat from the heated heat-exchange liquid to another solid or fluid medium.

More specifically, again referring to FIG. 2C, the liquid heat-exchange outlet 234" is connected or coupled to a common liquid heat-exchange outlet conduit 240 via an outlet interface 242 and the liquid heat-exchange inlet 236" is coupled to a common liquid heat-exchange inlet conduit (not shown as it is located under and superimposed by the common liquid heat-exchange outlet conduit 240) via an inlet interface 244.

FIG. 3 is a schematic diagram of a side cross-sectional view of a fuel cell system of the present teachings where a fuel cell unit includes a vaporizer that is within a thermally-shielded zone and the downstream end of the exhaust conduit from the afterburner terminates within the thermally-shielded zone.

Referring to FIG. 3, the fuel cell system 300 includes a fuel cell unit 302, which includes a reformer 304, a fuel cell stack 306, and an afterburner 308. The fuel cell unit is within a thermally-shielded zone 310. The thermally-shielded zone 310 includes temperature-regulating fluid inlets 312 and one or more exhaust fluid outlets 314. A source of positive gaseous pressure 316 is in operable fluid communication with the temperature-regulating fluid inlets 312.

The fuel cell system 300 or the fuel cell unit 302 includes a vaporizer 346 located within the thermally-shielded zone 310. The fuel cell system 300 or fuel cell unit 302 includes a cathode air conduit 348 for delivering cathode air through the afterburner 308 to a cathode (not shown) of the fuel cell stack 306; an anode air conduit 350 for delivering anode air to the vaporizer 346 and/or reformer 304 and then to an anode (not shown) of the fuel cell stack 306; a reformable fuel conduit 352 for delivering liquid reformable fuel to the vaporizer 346; and an exhaust conduit 322 for exhausting heated fluids such as heated afterburner combustion products from the afterburner 308. The exhaust conduit 322 depicted terminates inside of the thermally-shielded zone 310.

Again, the operation of the fuel cell system and fuel cell unit depicted in FIG. 3 is similar to the operation of the fuel cell units depicted in FIGS. 1B and 2B with the addition of a vaporizer within the thermally-shielded zone and the exclusion of a liquid heat-exchange plate or a liquid heat-exchange jacket (although a liquid heat-exchange plate or a liquid heat-exchange jacket can be used with the fuel cell system and fuel cell unit depicted in FIG. 3). Although the operation of the fuel cell system and fuel cell unit are similar, the inclusion of a vaporizer within the thermally-shielded zone can increase the use of the heat generated by the fuel cell unit, for example, the heat in the exhaust of the afterburner, as the exhaust of the afterburner is directed towards the vaporizer with the assistance of the source of positive gaseous pressure. The heat from the exhaust of the afterburner can heat (or pre-heat) the anode air before it enters the vaporizer as well as pre-heating the reformable fuel entering from the bottom of the thermally-shielded zone before the reformable fuel is delivered to the vaporizer. Moreover, the heat generated by the reformer and the fuel cell stack can be used to heat the vaporizer and the various fluid streams.

Figure 4A:
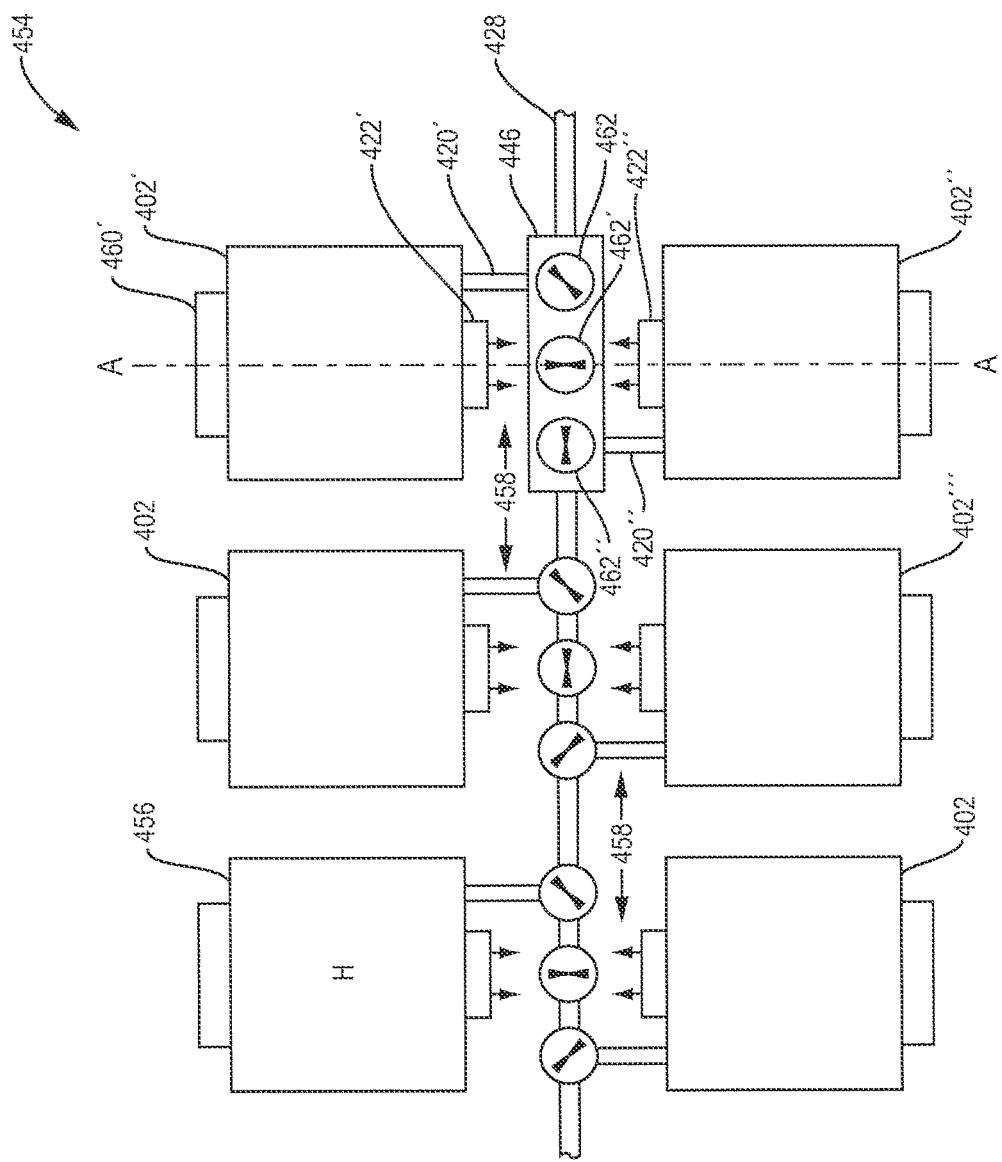
FIG. 4A is a schematic diagram of a top view of an embodiment of a CHP system of the present teachings where the CHP system includes five fuel cell units, a heater unit, a vaporizer in a channel between two fuel cell units, a plurality of sources of positive gaseous pressure to move and direct the exhaust from the fuel cell units and the heater, and a common fuel source conduit.

FIG. 4A is a schematic diagram of a top view of a CHP system, where five exemplary fuel cell units and a heater unit are connected to a common fuel source conduit and a vaporizer is present in a channel between a pair of fuel cell units.

Referring to FIG. 4A, the CHP system 454 includes five fuel cell units 402, 402', 402'', 402''', 402'''' and a heater unit 456. Each depicted fuel cell unit is substantially the same but for its placement in the fuel cell system, which can represent a "plug and play" fuel cell system in which individual fuel cell units and heater units can be removed and/or replaced with similarly designed and constructed units. For example, each of the anode reactants conduits of the fuel cell units (and a heater unit) is offset from the center of the fuel cell unit but regardless of its position, each fuel cell or heater unit is configured to be connected or coupled to a common fuel source conduit. Because each of the fuel cell units is substantially the same, every component or feature of each one is not labeled.

Still referring to FIG. 4A, one fuel cell unit 402' has its exhaust conduit 422' facing into a channel 458 present between a pair of fuel cell units 402', 402''. Likewise, the other of the pair of fuel cell units 402'' has its exhaust conduit 422'' facing into the channel 458 and towards the exhaust conduit 402' of the first fuel cell unit 402'. Consequently, each fuel cell unit can exhaust heated fluid, and/or preferentially transfer heat as described herein, from one or more of a reformer, a fuel cell stack and an afterburner (not shown here but in FIG. 4B) into a channel 458 present between this pair of fuel cell units as well as between the other fuel cell units and heater unit.

Positioned in the channel 458 is a common fuel source conduit 428, which has a plurality of interfaces (not shown as hidden in top view by the sources of positive gaseous pressure) to provide operable fluid communication between the common fuel source conduit and a reformer of each fuel cell unit or a heater unit. Also located in the channel 458 is a vaporizer 446, which can be connected to the common fuel source conduit 428 in a variety of configurations depending on the flow of reformable fuel through the system. As shown, the fuel cell unit 402' has its electronics 460' located opposite of the channel 458 to where the exhaust streams and thus, the heat, from the fuel cell units are expelled. Such an arrangement can assist the electronics in avoiding excessively high temperatures that can be generated by a fuel cell unit and fuel cell and CHP systems.

FIG. 4A also includes three sources of positive gaseous pressure 462, 462', 462'' associated with the channel 458 between the pair of fuel cell units discussed above 402', 402''. As can be seen for the CHP system, the pairs of adjacent fuel cell units or the adjacent fuel cell unit and heater unit have such sources of positive gaseous pressure present. Although only one source of positive gaseous pressure can be used to effect directional movement of the heated exhaust from the exhaust conduits, the use of two or three or more positive sources of gaseous pressure between each pair of units permits greater control over the flow of heated exhaust and other fluids within the channels. That is, each source of positive gaseous pressure can be considered to have its own "zone," for example, thermal zone, in which it is effective. Each vertically-defined thermal zone below a source of positive gaseous pressure independently can be monitored and the rate of delivery of positive gas pressure in such a thermal zone can controlled as appropriate for each source of positive gaseous pressure.

For example, in the depicted system, the central source of positive gaseous pressure 462', which is located above the exhaust conduits 422', 422'', may need to deliver more positive gas pressure to drive downward the concentrated heat from the exhaust ducts while the peripheral sources of positive gaseous pressure 462, 462'' may not need as strong or high of a flow rate of positive gas pressure to maintain a proper balance of the thermal environment within the fuel cell system.

Figure 4B:
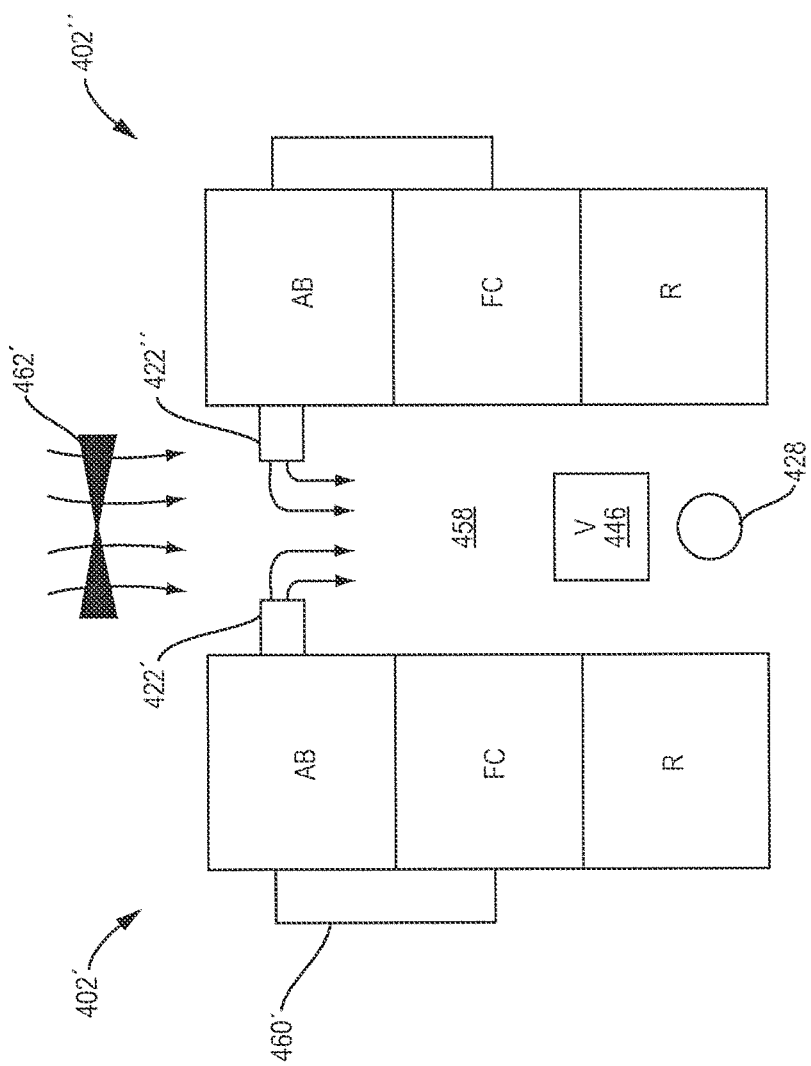
FIG. 4B is a schematic diagram of a side cross-sectional view of two exemplary fuel cell units of FIG. 4A along the line A-A.

Turning now to FIG. 4B, which is a schematic diagram of a side cross-sectional view of two exemplary fuel cell units 402', 402'' of the CHP system 454 of FIG. 4A cut along the line A-A, the source of positive gaseous pressure 462' can be seen near the top of the channel 458 such that it can direct the exhaust from the exhaust outlets 422', 422'' of each fuel cell unit 402', 402'', respectively. Such an arrangement efficiently can use the heat exhausted from the fuel cell unit to heat a vaporizer 446 and common fuel source conduit 428 located in the channel. In addition, the exhaust and heat from one fuel cell unit can be used to supplement heat to other fuel cell units, heater units, and/or components thereof as needed so that the entire CHP system (or fuel cell system) thermally can be managed more efficiently. As a result, the thermal environment in the CHP system (or fuel cell system) can be monitored and regulated to maintain a constant operating temperature or an appropriate operating temperature for each component or for each thermal zone of the system.

FIGS. 5A-F are schematic diagrams of top views of various configurations of fuel cell systems of the present teachings. Each fuel cell unit and its thermal insulation is represented by a square or a rectangle, where thermal insulation can be distributed about the fuel cell unit and associated with each face, segment thereof, or surface around the perimeter of the fuel cell unit. (It should be understood that for ease of reference and understanding, the depicted squares and rectangles are referred to a fuel cell units; however, a fuel cell unit (which could be tubular or another cross-sectional shape) would be within the square or rectangle is not necessarily in contact with the thermal insulation as shown.) The fuel cell units can be arranged in arrays to transfer preferentially heat between or among the fuel cell units, where a reduced level of thermal insulation is in contact with, adjacent to, and/or in thermal communication with one or more faces, segments thereof, or surfaces of the fuel cell unit. A face or surface of a fuel cell unit associated with a reduced level of thermal insulation is represented with a thinner line compared to other faces or surfaces represented by thicker lines. A reduced level of insulation refers to a reduced level of thermal insulation in comparison to thermal insulation in contact with, adjacent to, and/or in thermal communication with the other face(s), segment(s) thereof, and/or other surface(s) of the fuel cell unit.

A reduced level of insulation can be realized by many different designs and materials depending on various considerations such as the shape of a fuel cell unit or heater unit and the type of insulation used. For example, where a solid thermal insulation includes a sheet or layer of solid insulation material that can be positioned around a fuel cell unit, a reduced level of solid thermal insulation can be realized by using a thinner sheet or layer where preferential heat transfer is desired. To that end, in certain applications, a reduced level of thermal insulation can mean no thermal insulation is present. Where a fluid thermal insulation is used, for example, a volume of a gas such as air or an air blanket, a reduced level of fluid thermal insulation can be realized by using a thinner volume of the gas where preferential heat transfer is desired. Moreover, a liquid heat-exchange plate or a liquid heat-exchange jacket can be used in conjunction with the reduced level of thermal insulation or to provide a reduced level of thermal insulation where the heat-exchange plate or the liquid heat-exchange jacket can be thinner on one or more faces or surfaces of the fuel cell unit or not present. Combinations of solid thermal insulation and fluid thermal insulation are included in thermal insulation of the present teachings.

It should be understood that a reduced level of thermal insulation not only refers to a reduced amount of thermal insulation but also can refer to a reduced thermal barrier, or reduced thermal protection or retention. That is, different solid thermal insulation and/or fluid thermal insulation can be used that have different coefficients of thermal insulation, where a reduced level of thermal insulation can provide increased thermal transmission (or heat transfer). In other words, a similar amount of thermal insulation can be present but having different levels of thermal transmission and/or thermal conductivity thereby providing a reduce level of thermal insulation.

In addition, a reduced level of thermal insulation can be a grading of the thermal insulation along one or more faces or surfaces of a fuel cell unit or thermally-shielded zone or thermally-regulated zone. For example, the level of thermal insulation can increase or decrease along the direction of a face or a surface of a fuel cell unit from the reformer to the afterburner. A reduced level of thermal insulation can be present in contact with, adjacent to, and/or in thermal communication with a face, or a segment of a face (which can be considered to be a surface) but not the entire face. For example, a reduced level of thermal insulation can be present in contact with, adjacent to, and/or in thermal communication with one or more of a reformer, a fuel cell stack, and an afterburner such that the segment of the face can be the reformer, the fuel cell stack, the afterburner, the reformer and the fuel cell stack, the reformer and the afterburner, or the fuel cell stack and the afterburner. A reduced level of thermal insulation can be present on a segment of a face and can be graded within the segment.

Referring to FIG. 5A, the top view of a square horizontal cross-section of a fuel cell unit and its thermal insulation 503 has a thinner line representing a reduced level of thermal insulation on that face, a segment thereof, or surface (which is a "side" in the exemplified square or rectangular cross-sections) compared to the thermal insulation in contact with, adjacent to, and/or in thermal communication with the other sides of the fuel cell unit represented by the thicker lines. As shown in FIG. 5A, a reduced level of a thermal insulation, i.e., a reduced level of a solid thermal insulation and/or a fluid thermal insulation, is in contact with, adjacent to, and/or in thermal communication with one face, or segment thereof, or one surface of the fuel cell unit. Accordingly, heat can be preferentially transferred away from the fuel cell unit in the direction of the large arrow labeled "H."

FIG. 5B depicts a first fuel cell unit and its thermal insulation 503 and a second fuel cell unit and its thermal insulation 503', where a reduced level of a solid and/or fluid thermal insulation is in contact with, adjacent to, and/or in thermal communication with one face or one surface of the first fuel cell unit. As shown, the second fuel cell unit can be within a thermally-shielded zone or a thermally-regulated zone as no preferential heat transfer occurs from the second fuel cell unit and its thermal insulation 503'.

FIG. 5C depicts a first fuel cell unit and its thermal insulation 503 and a second fuel cell unit and its thermal insulation 503", where a reduced level of a solid and/or fluid thermal insulation is in contact with, adjacent to, and/or in thermal communication with one face or one surface of the first fuel cell unit and one face or one surface of the second fuel cell unit. As shown, the preferential heat transfer can occur from one fuel cell towards the other fuel cell unit, and vice versa. In such an arrangement, the thermal environments of each fuel cell unit can be maintained with the assistance of heat transfer from the other, as and if needed.

FIG. 5D depicts a first fuel cell unit and its thermal insulation 503, a second fuel cell unit and its thermal insulation 503", and a third fuel cell unit and its thermal insulation 503''', in a linear arrangement or array. As shown, the exterior faces or surfaces (as to the system) of each fuel cell unit include thermal insulation. However, a reduced level of a solid and/or fluid thermal insulation is in contact with, adjacent to, and/or in thermal communication with the interior faces or surfaces (as to the system) of the fuel cell units. Indeed, fuel cell unit and its thermal insulation 503''' includes two faces or surfaces that preferentially can transfer heat to or receive heat from the other fuel cell units.

FIG. 5E depicts a 2×3 array of fuel cell units and their respective thermal insulation $503iv$, $503v$, $503vi$, $503^{vii}$, $503^{viii}$, $503^{ix}$. Similar to the 1×3 array shown in FIG. 5D, the exterior faces or surfaces (as to the system) of each fuel cell unit include thermal insulation. However, a reduced level of a solid and/or fluid thermal insulation is in contact with, adjacent to, and/or in thermal communication with the interior faces or surfaces (as to the system) of the fuel cell units. In this arrangement, the fuel cell units not only preferentially can transfer heat between or among each 1×3 array, but also preferentially can transfer heat into and across the channel formed by each 1×3 array.

Finally, FIG. 5F depicts another 2×3 array of fuel cell units and their respective thermal insulation $503^{iv}$, $503^{v}$, $503^{vi}$, $503^{vii}$, $503^{viiii}$, $503^{ix}$. In this variation, the reduced levels of thermal insulation are on or adjacent to the exterior faces or surfaces (as to the system) and as well as the interior faces or surfaces adjacent to another fuel cell unit. Accordingly, the heat generated by the fuel cell units can be preferentially transferred outward and away from the internal channel between each 1×3 array of fuel cell units as shown by the large arrows labeled "H." Heat also can be preferentially transferred between fuel cell units as shown by the smaller arrows. Such an arrangement can permit the electronics and other heat sensitive components or equipment of the fuel cell system to be present in the channel (a thermally cooler zone) thereby permitting shorter connections, for example, for wiring and conduits, to each fuel cell unit.

Figure 6A:
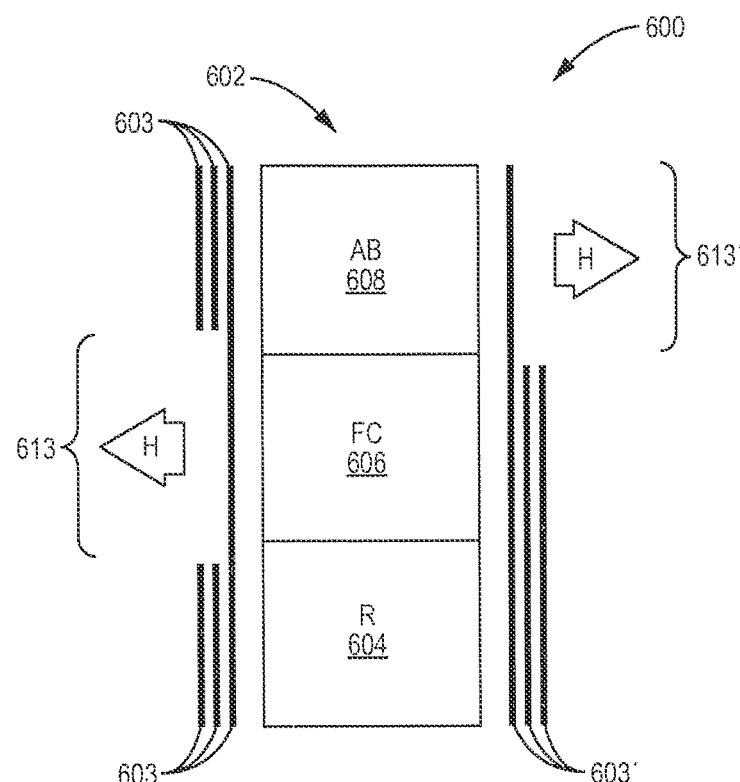
FIG. 6A is a schematic diagram of a side cross-sectional view of a fuel cell unit having a reduced level of thermal insulation on or adjacent to segments of two faces of the fuel cell unit. A segment of a face or surface of a fuel cell unit associated with a reduced level of thermal insulation is represented with one line compared to other segments of a face or surface represented by three lines.

FIG. 6A is a schematic diagram of a side cross-sectional view of a fuel cell system 600, which includes a fuel cell unit 602 that has a reformer 604, a fuel cell stack 606, and an afterburner 608. The fuel cell system 600 includes thermal insulation 603, 603' located in contact with or adjacent to but at least in thermal communication with the components of the fuel cell unit including the reformer, fuel cell stack and afterburner. The fuel cell system has reduced levels of thermal insulation 613, 613' on or adjacent to but at least in thermal communication with segments of two faces of the fuel cell unit 602.

As shown, a segment of a face or surface of a fuel cell unit associated with a reduced level of thermal insulation is represented with one line compared to other segments of a face or surface represented by three lines. The lines can represent sheets of solid thermal insulation such that the reduced level of thermal insulation is about two-thirds thinner than on or adjacent to other segments of the fuel cell unit. However, the depiction and differences in thickness can represent other forms and levels of thermal insulation as described herein. As shown, the particular design and arrangement of the reduced level of thermal insulation can preferentially transfer heat in the direction of the large arrows labeled "H," for example, away from a face or a surface of the fuel cell stack and away from an opposite face or opposite surface of the afterburner. Accordingly, thermal management of the fuel cell system can be controlled by the placement of reduced levels of thermal insulation in connection with individual components of a fuel cell unit as well as by the placement of such fuel cell units adjacent to each other in a fuel cell system.

Figure 6B:
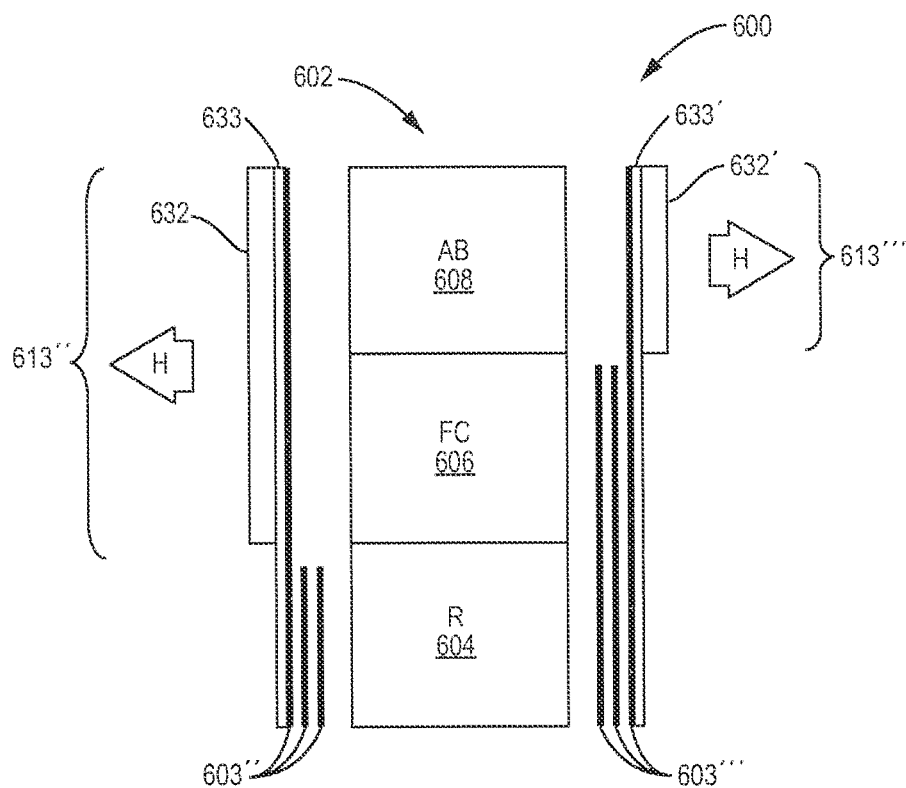
FIG. 6B is a schematic diagram of a side cross-sectional view of a fuel cell unit similar to FIG. 6A and includes one or more liquid heat-exchange plates or jackets adjacent to surfaces or faces of the afterburner and/or fuel cell stack associated with a reduced level of thermal insulation.

FIG. 6B is a schematic diagram of a side cross-sectional view of a fuel cell system 600 similar to that shown in FIG. 6A, which includes a fuel cell unit 602 that has a reformer 604, a fuel cell stack 606, and an afterburner 608. The fuel cell system 600 includes a retaining structure 633, 633' such as sheet metal or other rigid thermally conductive material that can maintain in place the components of the fuel cell unit 602 and adjacent thermal insulation 603", 603'". The fuel cell system has reduced levels of thermal insulation 613", 613'" on or adjacent to but at least in thermal communication with segments of two faces of the fuel cell unit 602 and more specifically, at least one face or one surface of the fuel cell stack 606 and at least two faces or two surfaces of the afterburner.

The fuel cell system also includes one or more liquid heat-exchange jackets or liquid heat-exchange plates 632, 632' (depending on whether the depicted liquid heat-exchange jackets or plates are one unit or two separate units). The liquid heat-exchange jackets or liquid heat-exchange plates 632, 632' are in contact with the outer retaining structure 633, 633' of the fuel cell unit 602. The liquid heat-exchange jackets or liquid heat-exchange plates 632, 632' are adjacent to (via a thermally conductive retaining structure) and in thermal communication with the faces or the surfaces of the fuel cell stack 606 and afterburner 608 associated with a reduced level of thermal insulation 613", 613'". Accordingly, heat such as radiant heat generated by the fuel cell stack and the afterburner can be preferentially transferred to the liquid in the liquid heat-exchange jacket or the liquid heat-exchange plate to assist in the thermal management of the fuel cell unit and fuel cell system.

Figure 6C:
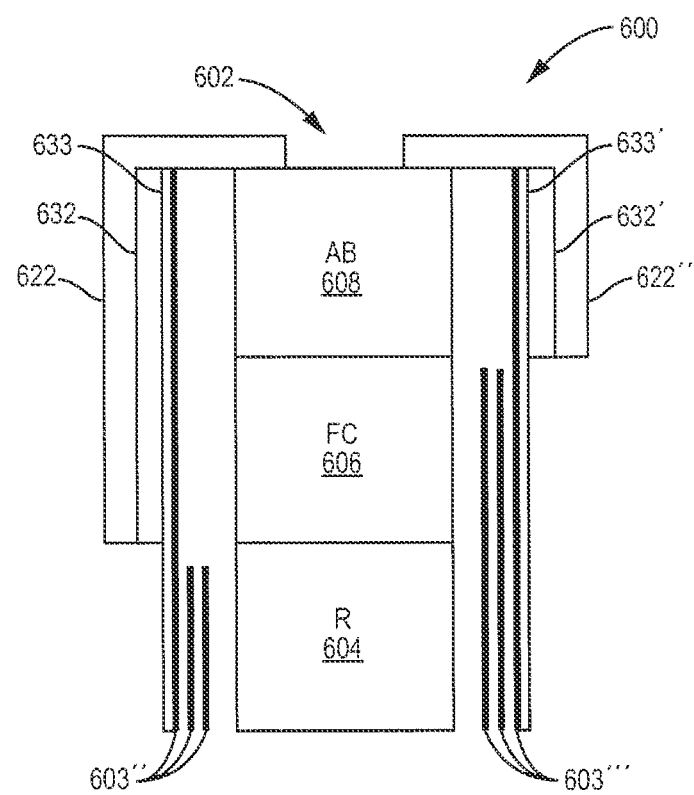
FIG. 6C is a schematic diagram of a side cross-sectional view of the fuel cell unit of FIG. 6B and includes two afterburner exhaust conduits in contact with or adjacent to the one or more liquid heat-exchange plates or jackets for an additional source of heat for the liquid heat-exchange liquid.

FIG. 6C is a schematic diagram of a side cross-sectional view of the fuel cell system 600 of FIG. 6B, with the addition of two afterburner exhaust conduits 622, 622' in contact with or adjacent to the one or more liquid heat-exchange plates or liquid heat-exchange jackets for an additional source of heat for the liquid heat-exchange liquid. For example, prior to exhausting and cooling the exhaust from the afterburner, a conduit or other channel can be in contact with or adjacent to but at least in thermal communication with a liquid heat-exchange plate or liquid heat-exchange jacket to provide another source of heat to maintain the temperature of the circulating liquid heat-exchange liquid for use as described elsewhere herein or known in the art.

Figure 6D:
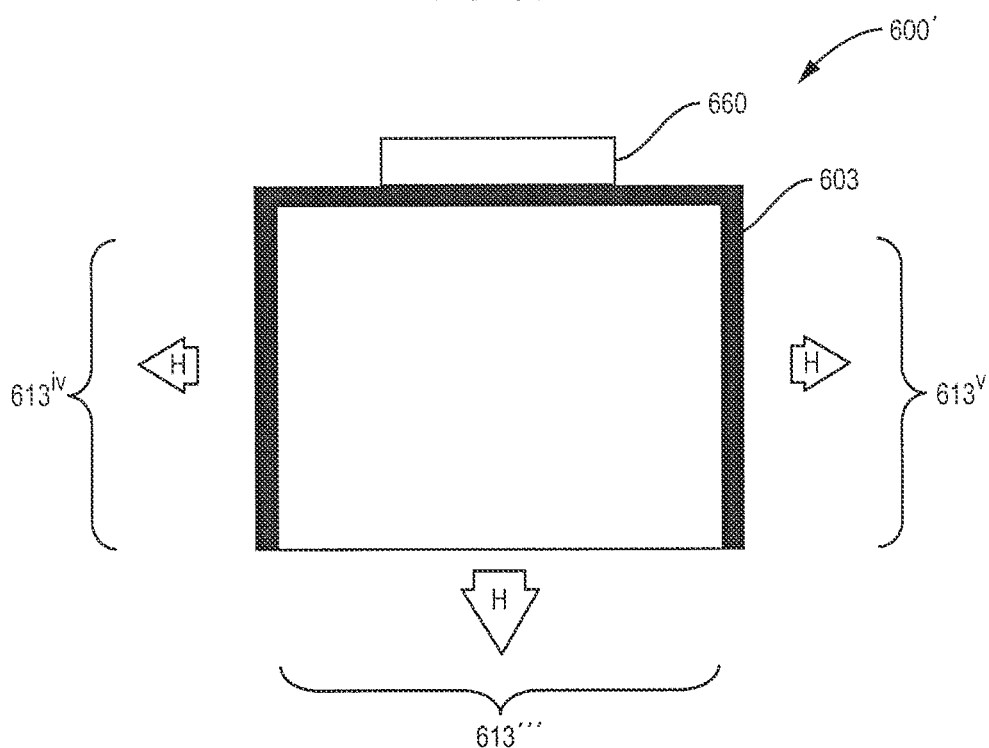
FIG. 6D is a schematic diagram of a top view of a fuel cell unit including its thermal insulation around the perimeter of the fuel cell unit where the electronics and/or power conditioning components of the fuel cell unit are located on or adjacent a face, a segment thereof, or surface of the fuel cell unit not having a reduced level of thermal insulation. A face or surface of a fuel cell unit associated with a reduced level of thermal insulation is represented with a thinner line compared to other faces or surfaces represented by thicker lines.

FIG. 6D is a schematic diagram of a top view of a fuel cell system 600' depicting a rectangular cross-section representing a fuel cell unit and its associated thermal insulation 603, where the thermal insulation is around the perimeter of the fuel cell unit similar to FIGS. 5A-5F. The fuel cell system includes a reduced level of thermal insulation on three faces or surfaces, where the thermal insulation can be absent or at a lowest or more reduced level across one face 613'", and a (moderately) reduced level of thermal insulation is present across two faces $613^{iv}$, $613^{v}$. As shown, an increased amount or level of heat transfer can occur from the face 613'" having the lowest level of reduced thermal insulation as represented by the large arrow labeled with "H," compared to the other faces $613^{iv}$, $613^{v}$ having an increased level of thermal insulation (but still a reduced level of thermal insulation for the fuel cell unit) as represented by the smaller arrows labeled "H." In this arrangement, the electronics and/or power conditioning components 660 of the fuel cell unit are located on or adjacent a face, a segment thereof, or surface of the fuel cell unit not having a reduced level of thermal insulation. That is, the electronics, current collection plates, bus bars and other heat-sensitive components can be located or positioned on or adjacent to a higher level of thermal insulation such as a thicker amount of solid thermal insulation to shield such components from heat transfer.

Figure 7:
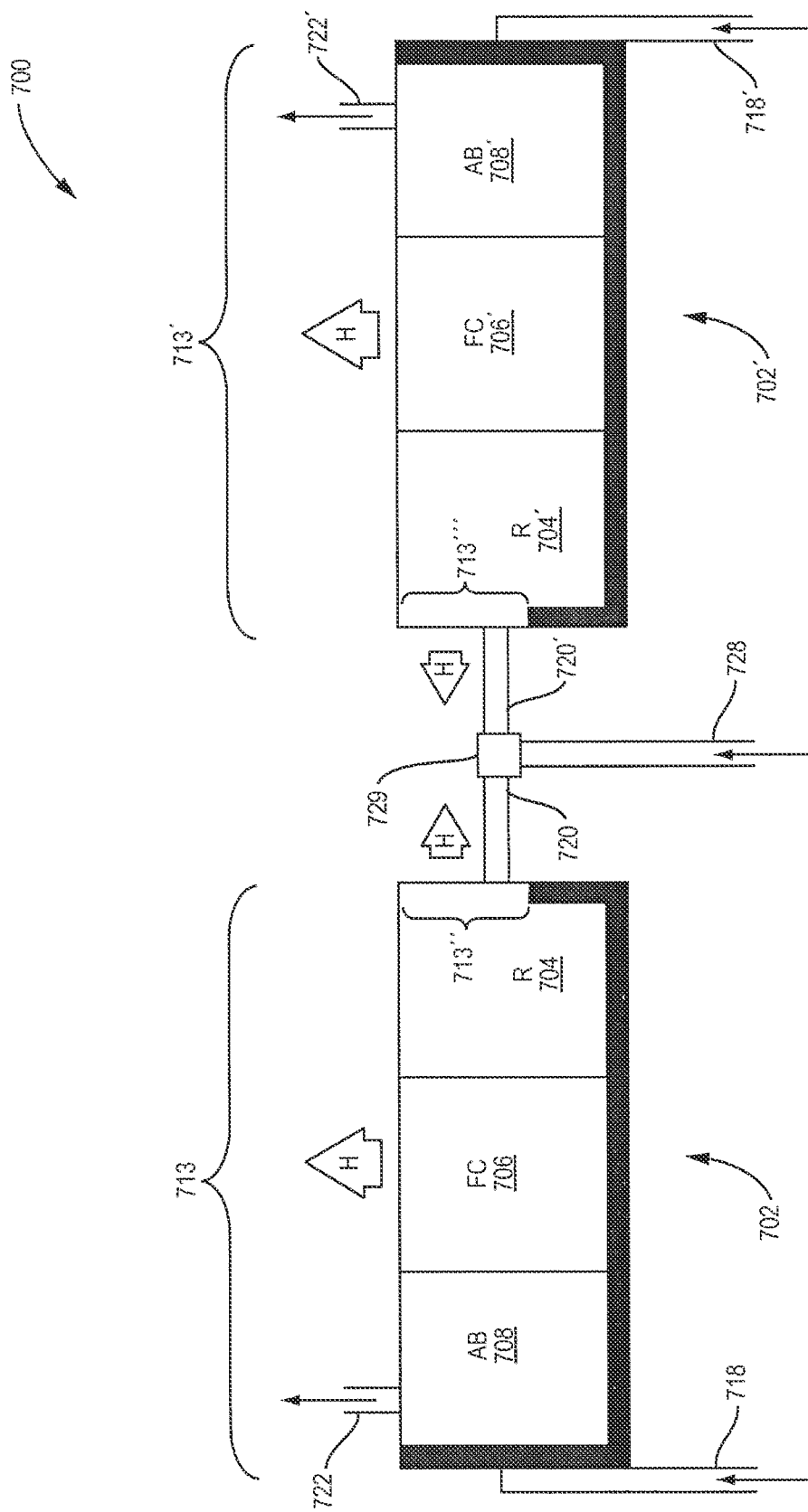
FIG. 7 is a schematic diagram of a top view of a fuel cell system having two fuel cell units arranged in a horizontal direction from the reformer to the fuel cell stack to the afterburner where the fuel cell units share a common fuel source conduit and the heat and exhaust of the fuel cell units is preferentially transferred in a direction away from the origination of the common fuel source conduit. A face or surface of a fuel cell unit associated with a reduced level of thermal insulation is represented with a thinner line compared to other faces or surfaces represented by thicker lines.

FIG. 7 is a schematic diagram of a top view of a fuel cell system 700 having two fuel cell units 702, 702', each arranged in a horizontal direction from their respective reformers 704, 704' to their fuel cell stacks 706, 706' to their afterburners 708, 708' where the fuel cell units share a common fuel source conduit 728 that is connected or coupled to their respective anode reactants conduits 720, 720' via a valve assembly 729. Each fuel cell unit has a reduced level of thermal insulation 713, 713' on the same face or surface as the exhaust conduits 722, 722'. Each fuel cell unit also has a reduced level of thermal insulation 713", 713'" between segments of a face or surface of the reformers 704, 704'. Each fuel cell unit includes a cathode air conduit 718, 718'. In this arrangement, the heat and exhaust of the fuel cell units is preferentially transferred in a direction away from the origination of the common fuel source conduit and the cathode air conduits as shown by the large arrows labeled with "H." Heat is preferentially transferred between the fuel cell units as shown by the smaller arrows labeled with "H." Such heat transfer can assist in heating and/or maintaining reactants in a vaporized or gaseous state, for example, a reformable fuel such as a liquid reformable fuel.

The present teachings encompass embodiments in other specific forms without departing from the spirit or essential characteristics thereof. The foregoing embodiments are therefore to be considered in all respects illustrative rather than limiting on the present teachings described herein. Scope of the present invention is thus indicated by the appended claims rather than by the foregoing description, and all changes that come within the meaning and range of equivalency of the claims are intended to be embraced therein.

The invention claimed is:

1. A method of thermally managing a fuel cell unit, the method comprising:
    transferring radiant heat preferentially from a face or a surface of a fuel cell unit,
        wherein a reduced level of a thermal insulation is in contact with, adjacent to, and/or in thermal communication with the face or the surface of the fuel cell unit thereby to increase radiant heat transfer from the face or the surface of the fuel cell unit comprising the reduced level of thermal insulation,
        wherein a reduced level of thermal insulation is in comparison to the level of thermal insulation in contact with, adjacent to, and/or in thermal communication with the other face(s) or other surface(s) of the fuel cell unit; and
    circulating a heat-exchange liquid in thermal communication with at least one of the faces or the surfaces of the fuel cell unit associated with the reduced level of thermal insulation thereby to transfer radiant heat preferentially from the face(s) or the surface(s) of the fuel cell unit to the heat-exchange liquid in a liquid heat-exchange plate or a liquid heat-exchange jacket, whereby the heat-exchange liquid remains a liquid.

2. The method of claim 1, wherein circulating a heat-exchange liquid comprises circulating a heat-exchange liquid comprising a glycol.

3. The method of claim 1, wherein circulating a heat-exchange liquid comprises circulating a heat-exchange liquid comprising water.

4. The method of claim 1, wherein circulating a heat-exchange liquid comprises circulating a heat-exchange liquid comprising a glycol and water.

5. The method of claim 1, wherein circulating a heat-exchange liquid comprises circulating a heat-exchange liquid comprising a glycol and a metal.

6. The method of claim 1, wherein circulating a heat-exchange liquid comprises circulating a heat-exchange liquid comprising a glycol and nano-sized metal particles.

7. The method of claim 1, further comprising:
    circulating heated heat-exchange liquid from the fuel cell unit towards a second fuel cell unit to reduce the time to initiate chemical reaction in or start-up of the second fuel cell unit in comparison to the time to initiate chemical reaction in or start-up of the second fuel cell unit without the benefit of the heated heat-exchange liquid from the fuel cell unit.

8. The method of claim 1, further comprising connecting the fuel cell unit to a common liquid heat-exchange conduit of a fuel cell system.

9. A method of thermally managing a fuel cell unit, the method comprising:
    transferring radiant heat preferentially from a face or a surface of a fuel cell unit,
        wherein a reduced level of a thermal insulation is in contact with, adjacent to, and/or in thermal communication with the face or the surface of the fuel cell unit thereby to increase radiant heat transfer from the face or the surface of the fuel cell unit comprising the reduced level of thermal insulation,
        wherein a reduced level of thermal insulation is in comparison to the level of thermal insulation in contact with, adjacent to, and/or in thermal communication with the other face(s) or other surface(s) of the fuel cell unit; and
    circulating a heat-exchange liquid in thermal communication with at least one of the faces or the surfaces of the fuel cell unit associated with the reduced level of thermal insulation thereby to transfer radiant heat preferentially from the face(s) or the surface(s) of the fuel cell unit to the heat-exchange liquid,
        wherein the heat-exchange liquid comprises a glycol and remains a liquid.

10. The method of claim 9, wherein the heat-exchange liquid comprises a glycol and water.

11. The method of claim 9, wherein the heat-exchange liquid comprises a glycol and a metal.

12. The method of claim 9, wherein the heat-exchange liquid comprises a glycol and nano-sized metal particles.

13. A method of thermally managing a fuel cell unit, the method comprising:
    transferring radiant heat preferentially from a face or a surface of a fuel cell unit,
        wherein a reduced level of a thermal insulation is in contact with, adjacent to, and/or in thermal communication with the face or the surface of the fuel cell unit thereby to increase radiant heat transfer from the face or the surface of the fuel cell unit comprising the reduced level of thermal insulation,
        wherein a reduced level of thermal insulation is in comparison to the level of thermal insulation in contact with, adjacent to, and/or in thermal communication with the other face(s) or other surface(s) of the fuel cell unit; and
    circulating a heat-exchange liquid through a liquid heat-exchange plate or a liquid heat-exchange jacket, which is in thermal communication with at least one of the faces or the surfaces of the fuel cell unit associated with the reduced level of thermal insulation, wherein the reduced level of thermal insulation is between the fuel cell unit and the liquid heat-exchange plate or the liquid heat-exchange jacket, thereby to transfer radiant heat preferentially from the face(s) or the surface(s) of the fuel cell unit to the heat-exchange liquid.

14. The method of claim 13, wherein circulating a heat-exchange liquid comprises circulating a heat-exchange liquid comprising a glycol.

15. The method of claim 13, wherein circulating a heat-exchange liquid comprises circulating a heat-exchange liquid comprising water.

16. The method of claim 13, wherein circulating a heat-exchange liquid comprises circulating a heat-exchange liquid comprising a glycol and water.

17. The method of claim 13, wherein circulating a heat-exchange liquid comprises circulating a heat-exchange liquid comprising a glycol and a metal.

18. The method of claim 13, wherein circulating a heat-exchange liquid comprises circulating a heat-exchange liquid comprising a glycol and nano-sized metal particles.

19. The method of claim 13, further comprising:
circulating heated heat-exchange liquid from the fuel cell unit towards a second fuel cell unit to reduce the time to initiate chemical reaction in or start-up of the second fuel cell unit in comparison to the time to initiate chemical reaction in or start-up of the second fuel cell unit without the benefit of the heated heat-exchange liquid from the fuel cell unit.

20. The method of claim 13, further comprising connecting the fuel cell unit to a common liquid heat-exchange conduit of a fuel cell system.

* * * * *